US011900046B2

(12) United States Patent
Stenerson et al.

(10) Patent No.: US 11,900,046 B2
(45) Date of Patent: Feb. 13, 2024

(54) INTELLIGENT FEATURE IDENTIFICATION AND PRESENTATION

(71) Applicant: MICROSOFT TECHNOLOGY LICENSING, LLC, Redmond, WA (US)

(72) Inventors: Derik Bjorn Stenerson, Redmond, WA (US); Bernhard Kohlmeier, Seattle, WA (US); Robyn Sambo, Redmond, WA (US); HongQiao Li, Seattle, WA (US); Jignesh Shah, Redmond, WA (US); Riyang Liu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/988,277

(22) Filed: Aug. 7, 2020

(65) Prior Publication Data

US 2022/0043964 A1    Feb. 10, 2022

(51) Int. Cl.
*G06F 17/00* (2019.01)
*G06F 40/166* (2020.01)
*G06N 20/00* (2019.01)
*G06F 40/30* (2020.01)
*G06F 3/0481* (2022.01)
*G06N 5/04* (2023.01)

(52) U.S. Cl.
CPC .......... *G06F 40/166* (2020.01); *G06F 3/0481* (2013.01); *G06F 40/30* (2020.01); *G06N 5/04* (2013.01); *G06N 20/00* (2019.01)

(58) Field of Classification Search
CPC .......... G06F 40/166; G06F 5/04; G06F 40/30; G06F 3/0481; G06N 20/00

USPC .......................................................... 715/256
See application file for complete search history.

(56) References Cited

U.S. PATENT DOCUMENTS

| 7,703,036 | B2 | 4/2010 | Satterfield et al. |
| 8,244,721 | B2 | 8/2012 | Morris et al. |
| 8,290,939 | B2 | 10/2012 | Bouillet et al. |
| 8,948,171 | B1 | 2/2015 | George et al. |
| 9,092,802 | B1* | 7/2015 | Akella ............... G06Q 30/0256 |
| 9,652,109 | B2* | 5/2017 | Borzello ............... G06F 3/0481 |
| 10,402,061 | B2* | 9/2019 | Kohlmeier ............ G06F 3/0482 |

(Continued)

OTHER PUBLICATIONS

Anonymous, 'Recognizing Formatting Information in a Document', IP.com, Dec. 13, 2017 (Year: 2017).*

(Continued)

*Primary Examiner* — Stephen S Hong
*Assistant Examiner* — Matthew J Ludwig
(74) *Attorney, Agent, or Firm* — NovoTechIP International PLLC

(57) ABSTRACT

A method and system for providing one or more suggested application features to a user of an application may include receiving an indication of a user action in a document, accessing contextual document data associated with the document, providing at least one of information about the user action or the contextual document data as input to a machine-learning (ML) model to predict a desired intent for the document, obtaining the predicted desired intent as an output from the ML model, identifying based on the predicted desired intent one or more application features that fulfil the desired intent, and providing data about the one or more application features for display.

6 Claims, 18 Drawing Sheets

(56) References Cited

U.S. PATENT DOCUMENTS

| | | | |
|---|---|---|---|
| 10,460,012 B2* | 10/2019 | Kohlmeier | G06F 40/166 |
| 10,649,619 B2* | 5/2020 | Chan | G06F 3/0482 |
| 10,706,450 B1* | 7/2020 | Tavernier | G06Q 30/0625 |
| 10,769,551 B2 | 9/2020 | Fujitani et al. | |
| 10,791,187 B2* | 9/2020 | Kang | H04L 67/55 |
| 10,810,491 B1 | 10/2020 | Xia et al. | |
| 10,867,346 B2 | 12/2020 | Wiesinger et al. | |
| 10,884,769 B2* | 1/2021 | Chandan | G06N 3/08 |
| 10,929,916 B2* | 2/2021 | Abutair | G06F 16/9535 |
| 10,944,771 B2 | 3/2021 | Borthakur et al. | |
| 11,036,811 B2* | 6/2021 | Modarresi | G06F 16/951 |
| 11,334,720 B2* | 5/2022 | Cason | G06N 20/00 |
| 11,347,756 B2* | 5/2022 | Kleiner | G06F 16/907 |
| 2003/0098891 A1 | 5/2003 | Molander | |
| 2006/0129634 A1 | 6/2006 | Khouzam et al. | |
| 2009/0216758 A1 | 8/2009 | Tuttle et al. | |
| 2009/0327301 A1* | 12/2009 | Lees | G06F 16/93 |
| 2011/0072046 A1 | 3/2011 | Chi | |
| 2011/0264785 A1 | 10/2011 | Newman et al. | |
| 2012/0143944 A1 | 6/2012 | Reeves et al. | |
| 2013/0073387 A1* | 3/2013 | Heath | G06Q 30/02 705/14.53 |
| 2013/0124529 A1 | 5/2013 | Jacob | |
| 2014/0173426 A1* | 6/2014 | Huang | G06F 40/205 715/256 |
| 2014/0188925 A1* | 7/2014 | Skolicki | H04N 21/8352 707/765 |
| 2014/0201195 A1 | 7/2014 | Kirazci et al. | |
| 2014/0279078 A1* | 9/2014 | Nukala | G06Q 30/0276 705/14.73 |
| 2014/0289597 A1* | 9/2014 | Kim | G06F 40/14 715/205 |
| 2014/0372506 A1 | 12/2014 | Butner et al. | |
| 2014/0379826 A1 | 12/2014 | Hertz et al. | |
| 2015/0100524 A1* | 4/2015 | Pantel | G06N 20/20 706/12 |
| 2015/0100562 A1* | 4/2015 | Kohlmeier | G06F 16/332 707/706 |
| 2015/0149429 A1* | 5/2015 | Chilakamarri | G06F 9/453 707/706 |
| 2015/0169285 A1* | 6/2015 | Reyes | G06F 3/167 715/728 |
| 2015/0262079 A1 | 9/2015 | Livshits et al. | |
| 2015/0347414 A1 | 12/2015 | Xiao et al. | |
| 2016/0092656 A1 | 3/2016 | Glaser-seidnitzer et al. | |
| 2016/0182709 A1* | 6/2016 | Kim | H04W 4/14 455/466 |
| 2016/0217213 A1 | 7/2016 | Vorontcov | |
| 2016/0357842 A1* | 12/2016 | Kohlmeier | G06F 16/285 |
| 2017/0228470 A1 | 8/2017 | Dacosta et al. | |
| 2017/0308291 A1* | 10/2017 | Luipold | G06F 16/90324 |
| 2017/0337602 A1 | 11/2017 | Davis | |
| 2018/0088677 A1 | 3/2018 | Zhang et al. | |
| 2018/0196665 A1 | 7/2018 | Yao et al. | |
| 2018/0203863 A1 | 7/2018 | Hansson et al. | |
| 2018/0322221 A1 | 11/2018 | Ambale et al. | |
| 2018/0349382 A1 | 12/2018 | Kumaran et al. | |
| 2019/0042976 A1 | 2/2019 | Tanglertsampan et al. | |
| 2019/0087691 A1 | 3/2019 | Jelveh | |
| 2019/0188295 A1 | 6/2019 | Sirotkovic et al. | |
| 2019/0197359 A1 | 6/2019 | Haneda et al. | |
| 2019/0251153 A1* | 8/2019 | Fournier, II | G06F 3/04842 |
| 2019/0294629 A1 | 9/2019 | Wexler et al. | |
| 2019/0347356 A1 | 11/2019 | Lindquist et al. | |
| 2019/0384622 A1 | 12/2019 | Chen et al. | |
| 2020/0005191 A1 | 1/2020 | Ganti et al. | |
| 2020/0019418 A1 | 1/2020 | P K et al. | |
| 2020/0097560 A1 | 3/2020 | Kulkarni | |
| 2020/0159862 A1* | 5/2020 | Kleiner | G06F 3/0482 |
| 2020/0183884 A1* | 6/2020 | Kohlmeier | G06F 16/13 |
| 2020/0226418 A1 | 7/2020 | Dorai-raj et al. | |
| 2020/0341815 A1 | 10/2020 | Manchale Sridhar et al. | |
| 2020/0344185 A1* | 10/2020 | Singaraju | G06K 9/6267 |
| 2020/0371825 A1* | 11/2020 | Mathew | G06N 5/02 |
| 2020/0380389 A1* | 12/2020 | Eldeeb | G06F 16/9535 |
| 2020/0387823 A1* | 12/2020 | Yao | G06F 9/451 |
| 2021/0004682 A1 | 1/2021 | Gong et al. | |
| 2021/0064627 A1* | 3/2021 | Kleiner | G06F 16/248 |
| 2021/0073293 A1* | 3/2021 | Fenton | H04L 51/08 |
| 2021/0224306 A1* | 7/2021 | Choudhary | G06Q 30/012 |
| 2022/0253449 A1 | 8/2022 | Kleiner et al. | |
| 2023/0117206 A1* | 4/2023 | Venkateshwaran | G06F 40/216 704/9 |

OTHER PUBLICATIONS

"To Come (Publishing)", Retrieved From: https://en.wikipedia.org/wiki/To_come_(publishing), Retrieved Date: Jul. 24, 2020, 1 Page.
"Application as Filed in U.S. Appl. No. 16/551,265", filed Aug. 26, 2019, 67 Pages.
"Non Final Office Action Issued in U.S. Appl. No. 16/551,265", dated Jun. 4, 2021, 48 Pages.
"International Search Report & Written Opinion issued in PCT Application No. PCT/US21/030769", dated Aug. 9, 2021, 15 Pages.
"Non Final Office Action Issued in U.S. Appl. No. 17/730,829", dated May 4, 2023, 44 Pages.
"Notice of Allowance Issued in U.S. Appl. No. 17/730,829", dated Nov. 8, 2023, 7 Pages.

* cited by examiner

INTELLIGENT FEATURE IDENTIFICATION AND PRESENTATION

TECHNICAL FIELD

This disclosure relates generally to intelligent identification of commands in an application, and, more particularly, to a method of and system for intelligently identifying relevant commands and presenting the identified commands as suggestions in improved user interface elements of a content creation application.

BACKGROUND

Content creation applications are often used to create content. For example, users may utilize a content creation application to write an article, draft an email, create a spreadsheet, prepare a presentation and the like. Most content creation applications provide numerous different commands for creating, editing, formatting, reviewing and/or consuming the content. Because of the sheer number of available commands, most users do not have the desire, time or ability to learn all of the commands and discover how to find and/or use them. As a result, most users utilize only a small fraction of available commands in a given content creation application. Even though some of the available commands may be very useful for the functions the users normally perform or the results they seek to achieve, users may never know about or use them.

Furthermore, some of the available commands can be difficult to locate and access. This is because some content creation applications include different commands in varying user interface (UI) elements. Furthermore, users may not be aware of the correct name for a specific command and as such may have difficulty locating their desired command This could mean that even when a user is aware of a command, they may have to click through multiple options to arrive at their desired command This can be time consuming and inefficient. These factors limit a user's ability to utilize an application effectively and efficiently and may limit the user's ability to accomplish desired results.

Hence, there is a need for improved systems and methods of intelligently identifying and/or presenting relevant commands

SUMMARY

In one general aspect, the instant disclosure describes a data processing system for providing one or more suggested application features. The data processing system operates to perform multiple functions. The functions may include receiving an indication of a user performing an action in a currently open document. Upon receiving the indication, the data processing system accesses and retrieves contextual document data associated with the document, and proceeds to provide information about the user action and the retrieved contextual document data as input to a machine-learning (ML) model configured for predicting a desired intent for the document, based on the user action. The predicted desired intent is provided as an output from the ML model. The data processing system then identifies, based on the predicted desired intent, one or more application features that fulfill the predicted desired intent, and provides data about the one or more application features for display on a user interface screen associated with the document.

The above general aspect may include one or more of the following features: the user action is a user request for display of application features, the user action is a zero term search for information, the user action is selection of a portion of content in the document or the user action is inputting text in a document. The application features include application commands displayed via a user interface element.

These general and specific aspects may be implemented using a system, a method, or a computer program stored on a non-transitory computer readable medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
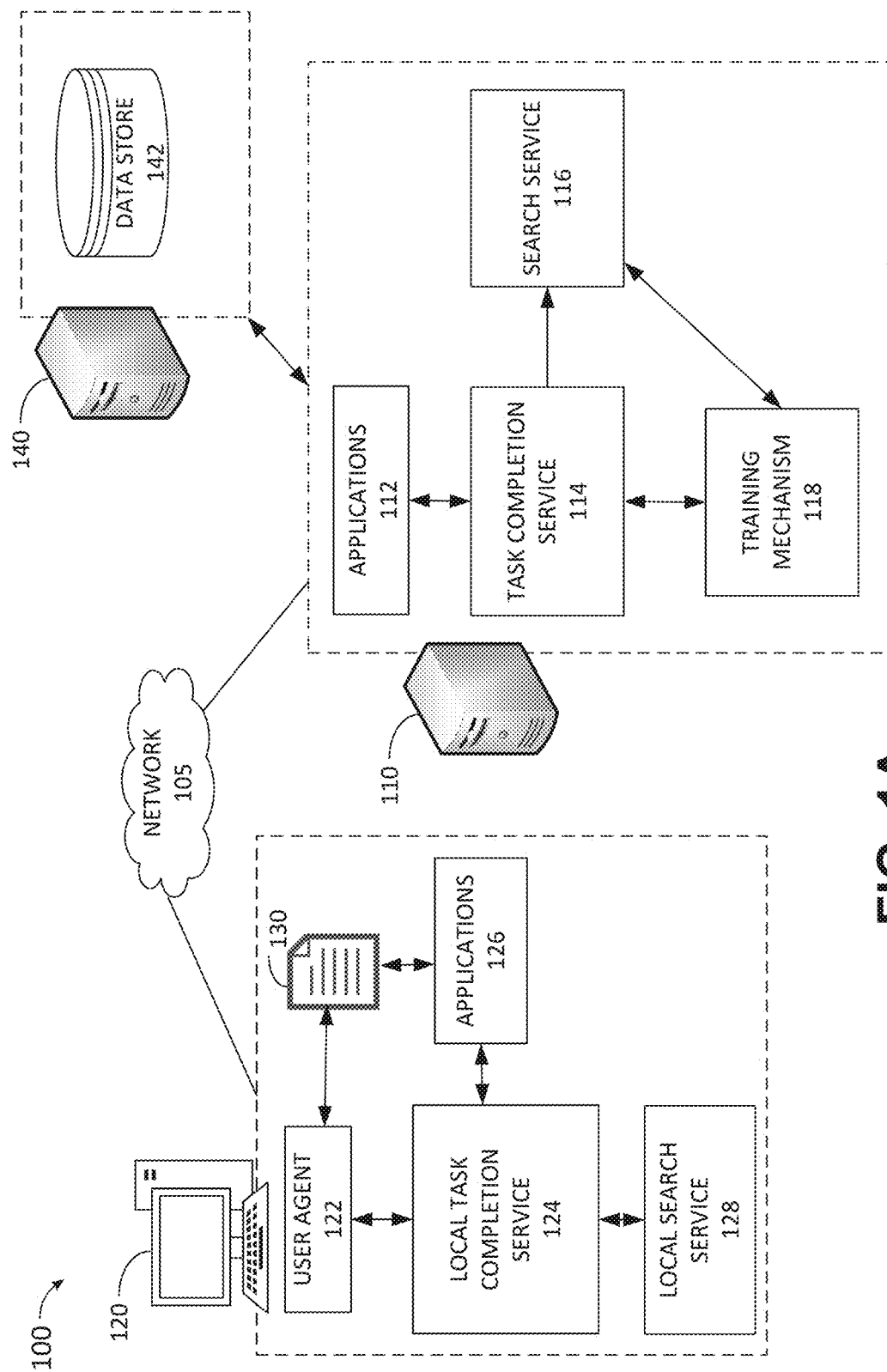
FIG. 1A-1C depict an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Users of computing devices often create many different types of digital content. These types of content are often created using complex content creation applications that offer many different types of features for performing various tasks. Because of the large number of available features, most content creation applications include various specific set of features in different UI elements (e.g., menu options).

For example, some content creation applications utilize a toolbar menu at the top of the content creation application featuring various tabs under each of which access to different features may be provided. In another example, content creation applications display a floating toolbar, which provides a number of features, in response to specific user actions. A context menu may be displayed in some content creation application in response to a right-click user input. Each of these menus include different commands, some of which may be provided at multiple different places. Each of these UI elements may display features and several different levels. For example, the toolbar menu may display top-level features at a top view, while sub-features (e.g., features that can be categorized under a top feature) are displayed at various sub-levels. This can cause confusion, inefficiency, and disruption in workflow, when a user attempts to locate a specific feature. Thus, there exists the technical problem of making complex and numerous commands, features, and functions of an application easily discoverable and accessible to users.

Furthermore, because of the complexity of the content creation applications and the large number of available features, most users are unaware of most features available in an application. Additionally, the sheer number of available commands may overwhelm some users. This may result in wasted time being spent on manually performing a task, while a feature may have achieved the same result in a fraction of the time. As a result, there exists a technical problem of enabling the user to learn about application features that the user is not familiar with but may assist the user achieve a desired intent.

Additionally, in trying to display hundreds of features in a manner that is easily locatable, valuable screen space is often dedicated to displaying several different UI menu options at various places on the UI screen. For example, a large toolbar menu is often displayed at the top of the content creation application screen. As such, there exists another technical problem of reducing the amount of screen space dedicated to displaying application features on the application screen.

To address these technical problems and more, in an example, this description provides a technical solution used for intelligently predicting the user's intent when the user is interacting with a content creation application, identifying, based on the intent, application feature(s) that can achieve the desired intent and providing the identified feature(s) as suggestions in an improved user interface that is easy to navigate and assists the user to perform the one or more steps required to achieve their desired intent. To do so, techniques may be used to predict the user's next intent with respect to the document based on one or more of context from the document (e.g., the subject matter of the document, to whom it is being addressed, etc.), action(s) the user is currently taking, user-specific information, organization-specific information, and global user information. The predicted intent may be examined to identify which feature(s) provided by the application may achieve the desired intent. The identified feature(s) may then be presented to the user in a user-friendly manner The process of predicting the user's intent and presenting suggested features as a result may be invoked reactively and/or proactively (e.g., without user request). In one implementation, presenting the identified features to the user may involve displaying the identified features on-canvas instead of a displaying them on a different pane or other regions of the UI screen. In one implementation, mechanisms for searching for specific features and/or information is provided on-canvas, as the user is interacting with the document. Various steps of these mechanisms may be performed by utilizing one or more machine-learning (ML) models. As a result, the technical solution provides an improved method of displaying features in a content creation application which is adaptable and responsive to the user's needs.

As will be understood by persons of skill in the art upon reading this disclosure, benefits and advantages provided by such implementations can include, but are not limited to, a technical solution to the technical problems of inefficient and confusing display of features in content creation applications, user-inaccessibility or lack of knowledge of various features and/or efficiently utilizing UI screen space. Solutions and implementations provided herein optimize the process of content creation by providing an experience that is optimized to lead to job completion. This may enable the user to maintain their focus in the flow of their work, instead of disrupting their attention. By providing on-canvas search and commanding, applications provide a more simple, powerful, approachable and responsive experience for users. Furthermore, by providing features, as needed, on-canvas, UI screen space may be conserved and better utilized. The benefits provided by these technology-based solutions yield more user-friendly applications, and increased system and user efficiency.

As used herein, "feature" may refer to a command, an option or a functionality offered by an application to perform a given task. Furthermore, as used herein, a user's "desired intent" may refer to a desired outcome, desired intent or a desire to achieve a certain result. The term "effectuating the user's intent" may be used to refer to accomplishing the user's desired intent to complete one or more tasks. Additionally, "intent" may refer to what a user wants to accomplish. As such, intent can be a complex task such as create a calendar, or a less complex task such as access a particular feature. The term on-canvas may refer to content and/or UI features displayed on a content pane or the main portion of the UI screen.

FIG. 1A illustrates an example system 100, upon which aspects of this disclosure may be implemented. The system 100 may include a server 110 which may include and/or execute a task completion service 114 and a search service 116. The server 110 may operate as a shared resource server located at an enterprise accessible by various computer client devices such as client device 120. The server may also operate as a cloud-based server for offering global task completion and contextual UI generating services. Although shown as one server, the server 110 may represent multiple servers for performing various different operations. For example, the server 110 may include one or more processing servers for performing the operations of the task completion service 114 and the search service 116.

The task completion service 114 may provide intelligent task completion within an enterprise and/or globally for a group of users. The task completion service 114 may operate to examine user input (e.g., user interactions with a document) and examine at least one or more of document context information, user context information (e.g., user-specific information), organization-specific information, global user information, and/or other data to decipher the user's desired. Based on the predicted intent, the task completion service 114 may identify one or more features that are likely to achieve the user's desired intent. In one implementation, one or more operations of the task completion service 114 are performed reactively (e.g., in response to specific user action and/or request). Alternatively, and/or additionally, one or more operations of the task completion service 114 may be performed proactively, as further discussed below. The task completion service 114 may be provided by one or more task completion ML models, as further discussed below with regards to FIG. 1B.

The search service 116 may provide intelligent on-canvas searching for information requested by a user and/or related to a document. This may include searching for features (e.g., natural language searching on how to perform a task) and/or searching for specific information (e.g., searching for one or more terms in one or more sources). The search service 116 may receive one or more search terms from either the content and/or an on-canvas UI element, identify one or more appropriate sources to search for information relevant to the document and/or the search terms, and provide the search terms to one or more search engines for searching. Alternatively, and/or additionally, the search service 116 may conduct the searching by utilizing one or more localized search engines. In identifying the relevant sources, in addition to the search term(s), the search service 116 may take into account contextual information relating to the document, the user and/or other relevant parameters. In one implementation, in providing the relevant search results, the search service 116 may perform relevance ranking to identify the more relevant search results. It should be noted that although the search service 116 is shown as a separate service, in one implementation, the operations of the search service 116 may be performed by the task completion service 114, as part of any other service, or as part of a user's local client device. It should also be noted that a search may include searching by one or more keywords, natural language, and/or other terms identified as being associated with the search terms.

The server 110 may be connected to or include a storage server 140 containing a data store 142. The data store 142 may function as a repository in which documents, contextual information and/or data sets (e.g., training data sets) may be stored. One or more ML models used by the task completion service 114 and search service 116 may be trained by a training mechanism 118. The training mechanism 118 may use training data sets stored in the data store 142 to provide initial and ongoing training for each of the models. Alternatively, and/or additionally, the training mechanism 118 may use training data sets unrelated to the data store. This may include training data such as knowledge from public repositories (e.g., internet), knowledge from other enterprise sources, or knowledge from other pretrained mechanisms (e.g., pretrained models). In one implementation, the training mechanism 118 may use labeled training data from the data store 142 to train one or more of the ML models via deep neural network(s) or other types of ML algorithms Alternatively, and/or additionally, the training mechanism 118 may use unlabeled training data. The initial training may be performed in an offline stage or may be performed online. Additionally, and/or alternatively, the one or more ML models may be trained using batch learning. It should be noted that in collecting and storing training data and training the ML models care is taken to ensure users privacy is protected and the training is performed such that it complies with ethical and legal guidelines.

As a general matter, the methods and systems described herein may include, or otherwise make use of, a machine-trained model to predict a user's desired intent with respect to a document and/or identify features that can achieve an identified desired intent. Machine learning (ML) generally involves various algorithms that a computer can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activity and/or determine associations between various actions and commands Such determination may be made following the accumulation, review, and/or analysis of data from a large number of users over time, that may be configured to provide the ML algorithm (MLA) with an initial or ongoing training set. In addition, in some implementations, a user device can be configured to transmit data captured locally during use of relevant application(s) to the cloud or the local ML program and provide supplemental training data that can serve to fine-tune or increase the effectiveness of the MLA. The supplemental data can also be used to facilitate identification of relevant commands and/or to increase the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of these ML models may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

It should be noted that the ML model(s) discussed herein may be hosted locally on the client device 120 or remotely, e.g., in the cloud. In one implementation, some ML models are hosted locally, while others are stored remotely. This may enable the client device 120 to provide some task completion and display service even when the client device 120 is not connected to a network.

The server 110 may also include or be connected to one or more online applications 112 that allow a user to interactively view, generate and/or edit digital content. Examples of suitable applications include, but are not limited to, a word processing application, a presentation application, a note taking application, a text editing application, an email application, a spreadsheet application, an instant messaging application, a communications application, a digital drawing application, and a collaboration application.

The client device 120 may be connected to the server 110 via a network 105. The network 105 may be a wired or wireless network(s) or a combination of wired and wireless networks that connect one or more elements of the system 100. The client device 120 may be a personal or handheld computing device having or being connected to input/output elements that enable a user to interact with digital content such as content of an electronic document 130 on the client device 120. Examples of suitable client devices 120 include, but are not limited to, personal computers, desktop computers, laptop computers, mobile telephones; smart phones; tablets; phablets; smart watches; wearable computers; gaming devices/computers; televisions; head-mounted display devices and the like. The internal hardware structure of a client device is discussed in greater detail in regard to FIGS. 6 and 7.

The client device 120 may include one or more applications 126. Each application 126 may be a computer program executed on the client device that configures the device to be responsive to user input to allow a user to interactively view, generate and/or edit digital content such as content within the electronic document 130. The electronic document 130 can include any type of data, such as text (e.g., alphabets, numbers, symbols), emoticons, still images, video and audio. The electronic document 130 and the term "document" used herein can be representative of any file that can be created via an application executing on a computer device. Examples of documents include, but are not limited to, word-processing documents, presentations, spreadsheets, notebooks, email messages, and the like. The electronic document 130 may be stored locally on the client device 120, stored in the data store 142 or stored in a different data store and/or server.

The application 126 may process the electronic document 130, in response to user input through an input device, to create and/or modify the content of the electronic document 130, by displaying or otherwise presenting display data, such as a GUI which includes the content of the electronic document 130, to the user. Examples of suitable applications include, but are not limited to, a word processing application, a presentation application, a note taking application, a text editing application, an email application, a spreadsheet application, an instant messaging application, a communications application, and a collaboration application.

The client device 120 may also access applications 112 that are run on the server 110 and provided via an online service as described above. In one implementation, applications 112 may communicate via the network 105 with a user agent 122, such as a browser, executing on the client device 120. The user agent 122 may provide a UI that allows the user to interact with application content and electronic documents stored in the data store 142 and/or on the client device 120. The UI may be displayed on a display device of the client device 120 by utilizing, for example, the user agent 122. In some examples, the user agent 122 may be a dedicated client application that provides a UI and access to electronic documents stored in the data store 142 and/or on the client device 120. In other examples, applications used to create, edit, review and/or view digital content such as content of electronic documents may be local applications such as the applications 126 that are stored and executed on the client device 120, and provide a UI that allows the user to interact with application content and electronic document 130. In some implementations, the user agent 122 may include a browser plugin that provides access to desired intent prediction and/or task completion and displaying of suggested features for content created via the user agent (e.g., content created on the web such as social media posts and the like).

In one implementation, the client device 120 may also include a local task completion service 124 for providing some local task completion, for example, in documents, such as the document 130, and a local search service 128 for providing local search services. In an example, the local task completion service 124 and local search service 128 may operate with the applications 126 to provide local task completion and/or search services. For example, when the client device 120 is offline, the local task completion and/or search services may make use of one or more local classifiers to predict desired intent, identify relevant features, and/or conduct searches to provide the suggested features and/or search results for display to the user. In some implementations, the local task completion and/or search services make use of local repositories to perform offline operations. In one implementation, enterprise-based repositories that are cached locally may also be used to provide local task completion and/or searching services.

It should be noted that each of the task completion service 114, search service 116, local task completion service 124 and local search service 128 may be implemented as software, hardware, or combinations thereof.

Figure 1B:
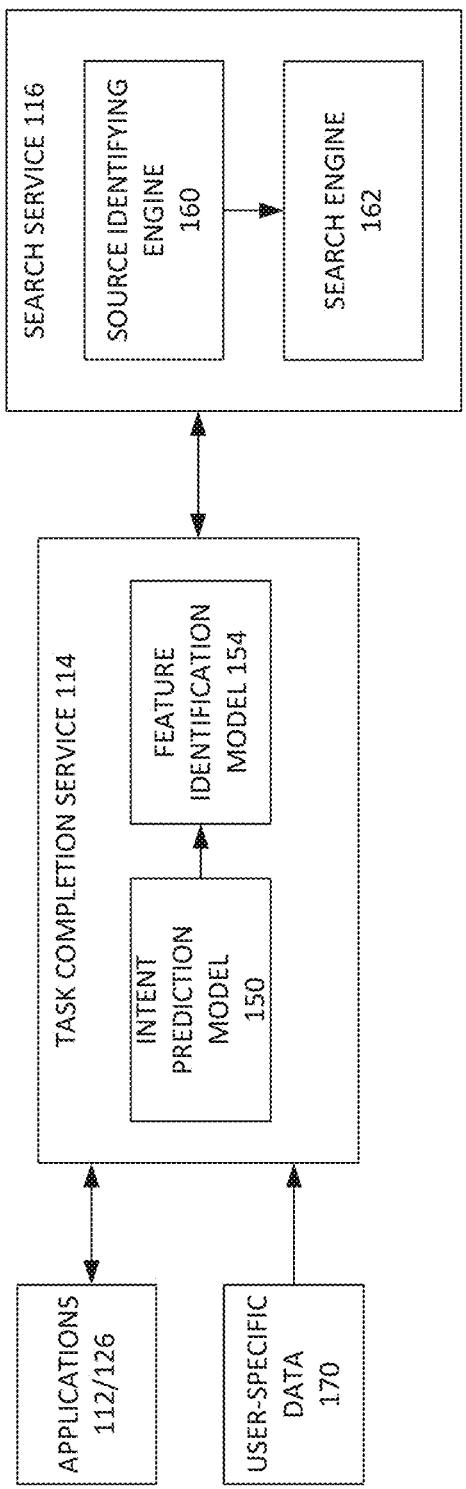

FIG. 1B depicts a system level data flow between some of the elements of system 100. As discussed above, information about a document being created, edited, reviewed, and/or viewed by one or more applications 112 (or applications 126) may be transmitted to the task completion service 114 to identify one or more features that can be used for completing a task associated with the user's desired intent. The information transmitted from the applications 112/126 may be referred to as contextual document data and may include information about the user's interactions with the document (e.g., one or more of the latest actions the user has taken in the document). Additionally, the information may include contextual data about the document and/or application. For example, the contextual document data may include the type of application from which the information was received, the subject matter of the document (which may be or may have been inferred separately and/or in the past by one or more ML models), the type of document (e.g., scientific article, poetry, patent application, etc.), the person(s) to whom it is directed (e.g., the to line of an email message), the overall tone of the document (e.g., formal, causal, and the like), and one or more content segments of the document, among others. The contextual document data may be transmitted directly from the document and/or may be transmitted from other services that provide the type of specific type of information (e.g., a tone detection service for providing the overall tone of the document).

In one implementation, the contextual document data transmitted from the application may be sent upon a user request. For example, the contextual document data may be transmitted, when the user utilizes an input/output device (e.g. a mouse) coupled to the client device 120 to invoke a UI option to display one or more commands for the document or for a selected content segment, conduct a search for a command, or conduct a search for one or more search terms. Alternatively, the contextual document data may be transmitted without direct user request in some applications (e.g., word processing document) to enable proactive identification and display of suggested features and/or search results. For example, some applications may automatically submit a request for conducting a search upon specific user actions and/or creation of certain content. In another example, a request for suggested features may be automatically submitted upon specific user actions (e.g., upon insertion of an object).

In one implementation, in addition to the contextual document data, user-specific data 170 is transmitted to the task completion service 114. The user-specific data 170 may include information about the user creating the content, the type(s) of actions performed by the user within the document (e.g., within a specific time period and/or since document creation, the position of the user within an organization (e.g., the user's job title or department to which the user belongs, if known), the types of documents the user generally creates, edits, reviews and/or views, the user's use-history (e.g., the user's writing style, vocabulary level, proficiency in use of the application, most often-used features within the application), user profile data (e.g., various profiles within which the user creates content such as work profile, blogger profile, social media profile and the like) and the like. In some implementations, some of the information transmitted may be transmitted from the data store 142 and/or other data repositories. The data repository may contain user-specific data about the user. For example, it may contain user profile and/or use history data. The data contained in the data store 142 may be provided as an input directly from the data store 142 or it may be retrieved by applications 126/applications 112 and transmitted from them.

When contextual document data that is transmitted for task completion and/or searching includes document content, the document content may include one or more segments. For example, the content may include multiple sentences (e.g., a paragraph or an entire document). When the transmitted content includes more than one sentence, the task completion service 114 may utilize a parsing engine (not shown) to parse the content into one or more smaller segments.

The contextual document data and user-specific data 170 may be transmitted to an intent prediction model 150 for detecting the user's desired intent based on the received information. The intent prediction model 150 may be a trained ML model that is trained to identify a user's desired intent based on the user's recent actions within the document, contextual document data, and/or user-specific data 170. The trained intent prediction model 150 may examine the action that invoked the transmission of the contextual document data (e.g., user request or specific user action), the remaining content and context of the document, and the user-specific data 170 to predict the user's desired intent with respect to the document. For example, when the user utilizes a mouse to highlight a text portion (e.g. a phrase), the intent prediction model 150 may examine the selected text portion and determine based on the position of the text portion within the document (e.g., on a separate line), the current formatting (e.g., each word of the selected text portion is capitalized), the remaining content of the document, and/or user-specific data 170 (e.g., the user often manually formats a heading). Based on this information, the intent prediction model 150 may predict that the user desires to format the selected text portion as a heading. In another example, upon insertion of an image, the intent prediction model 150 may examine the position and size of the inserted image, compare that to other images already inserted into the document and formatted by the user, and determine based on the other images, that the user intends to center the image and/or resize it to a specific size for a consistent look. As another example, the intent prediction model 150 may examine an unfinished sentence being drafted by the user and determine based on the content of the sentence that the user desires to complete their sentence with a fact that may need be researched. For example, for the unfinished sentence "the current population of Seattle is," the intent prediction model 150 may predict that the user intends to conduct research to obtain the number associated with the current population of Seattle. Thus, the intent prediction model 150 may receive as contextual document data and user-specific data as input, and may provide as a predict desired intent as an output.

The predicted desired intent may be provided by the intent prediction model 150 to the feature identification model 154. The feature identification model 154 may be a trained ML model which is trained to identify, for various types of applications, one or more features that can fulfill a given desired intent. In one implementation, the feature identification model 154 may include a classifier that classifies a given desired intent as corresponding to one or more application features. In one implementation, the feature identification model 154 identifies a serious of features that may need to be utilized to complete the task associated with the desired intent. For example, if the predicted desired intent is to insert a chart that corresponds with the overall style and formatting of the document, the features required to achieve this desired intent include selecting a column chart (e.g. the type of chart may be inferred from the content of the document, from user-history data, from organization-specific data or from global user data), selecting style 2 for the column chart, centering the chart and resizing the chart to a size similar to the other charts in the document.

In some implementations, multiple features are identified as corresponding to the predicted desired intent. For example, if the desired intent is predicted as formatting a paragraph, the features may include font, font color, font size, line and paragraph spacing, and the like. In some implementations, a score may be calculated for each identified feature, based on the likelihood of the feature achieving the desired intent. The identified features may then be ranked, based on the score. This ranking may be used in presenting the identified features to the user. Once the features(s) are identified, they may be transmitted back as an output to the applications 112/126, where they are used to provide display data to the user to notify the user of the suggested features.

It should be noted that different applications include different features. As such, the task completion service 114 may include a different trained feature identification model 154 for each type of application. Alternatively, the trained feature identification model 154 may be trained to identify an appropriate feature based on the type of application from which the contextual document data was received.

When the feature identification model 154 determines that the identified feature includes conducting a search either for a feature or for other information, a search query may be submitted to the search service 116. In some implementations, this involves identifying one or more search terms for the search query. In an example, the search query is a 0.5 term search query, in which the search term(s) may be determined by utilizing document context. In another example, the search term(s) may be identified based on the selected content segment (e.g., when a text portion is selected). In yet another example, the search involves conducting a zero-term search. Zero-term search may refer to instances where the user does not provide search terms for a query, but the search is conducted based on contextual document data and/or user-specific data. For example, when the user is drafting an unfinished sentence that requires factual information to be completed, the intent prediction model 150 and/or feature identification model 154 (other ML models may also be used) may identify the search term(s) required for conducting the search based on the content of the sentence. In another example, when the desired intent is predicted as conducting a search for an application feature, the search terms may relate to recent user actions within the document. For example, if the last user action was inserting a table and the predicted user intent is conduct a search for features offered by the application, the search terms may include formatting a table.

The search service 116 may include a source identifying engine 160 and a search engine 162. The source identifying engine 160 may receive the search query and identify one or more sources to search based on various parameters. To achieve this, the source identifying engine 160 may make use of a classifier that examines the one or more search terms, classifies the search terms based on predetermined parameters (e.g., based on subject matter by using one or more models relating to text classification and topic modeling) and determines based on the classification which source(s) should be used for conducting the search. This may involve use of one or more ML models. As such, the source identifying engine 160 may include one or more ML models. The sources may be publicly available sources (e.g., public webpages), sources associated with the application (e.g., index of features offered by the application), enterprise sources (e.g., business intelligence and analytics data structures), and/or sources associated with the user (e.g., local or cloud storage). Thus, the source identifying engine 160 may receive the search request along with other relevant information as inputs and provide revenant sources for searching as an output.

The identified relevant sources may be provided as an input to the search engine 162 which may also receive the search request (along with additional contextual information relating to the search request) from the task completion service 114 and/or directly from applications 112/126. The search engine 162 may use the received input to conduct one or more searches of the relevant sources to identify search results. In one implementation, in addition to identifying search results, the search engine 162 may also perform relevance ranking to identify the more relevant search results. Thus, the search engine 162 may output relevant search results. Thus, the search service 116 may receive a search query as an input and may provide a list of search results as an output. The output may be provided back to the task completion service 114, which may in turn, transmit the search results back to applications 126/112 for display to the user. Alternatively, the search results may be transmitted directly form the search service 116 to the applications 126/112 for display to the user. It should be noted that, in some implementations, the operations of the search service 116 are performed by one or more local classifiers.

In some implementations, the task completion service 114 may provide display data to the applications 112/126 for displaying the identified features and/or search results in a manner that is easy to navigate and/or conserves UI screen space. In some implementations, this includes displaying one or more on-canvas UI elements to help the user move through the one or more identified features to achieve their desired intent.

Figure 1C:
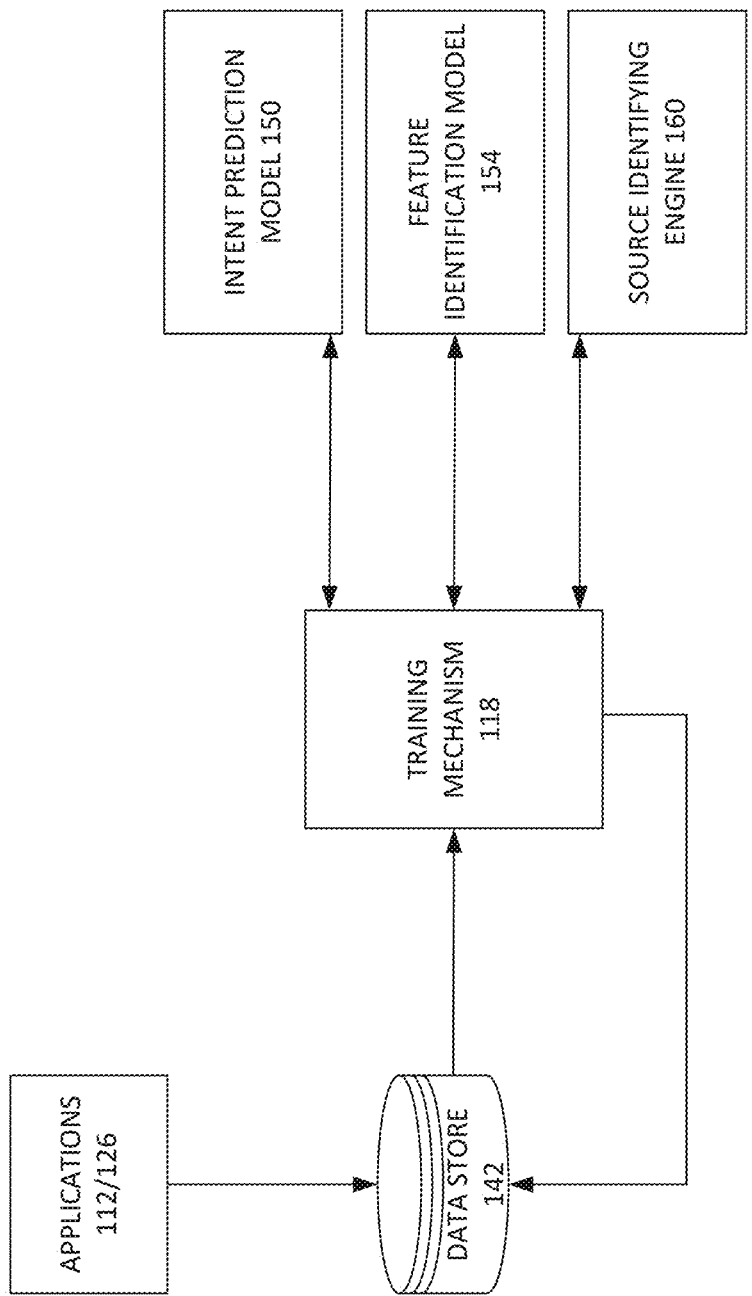

FIG. 1C depicts how one or more ML models used by the task completion service 114 and search service 116 may be trained by using the training mechanism 118. The training mechanism 118 may use training data sets stored in the data store 142 to provide initial and ongoing training for each of the models included in the task completion service 114 and search service 116. For example, each of the intent prediction models 150, feature identification model 154 and the source identifying models within the source identifying engine 160 may be trained by the training mechanism 118 using corresponding data sets from the data store 142.

The intent prediction model 150 may be trained by using labeled training data. The training data may include parameters for user action(s) within a document, contextual document data, and user-specific data as they correspond with specific desired intents. The labeling process may be performed by a number of users. In some implementations, the training data may include user data collected during use of content creation applications. The labeled training data may then be used in a supervised learning process to train the intent prediction model 150. It should be noted that in collecting and storing training data and training the ML models care is taken to ensure users privacy is protected.

The feature identification model 154 and models of the source identifying engine 160 may similarly be trained using a supervised learning process by using labeled data. To provide ongoing training, the training mechanism 118 may also use training data sets received from each of the trained ML models. Furthermore, data may be provided from the training mechanism 118 to the data store 142 to update one or more of the training data sets in order to provide updated and ongoing training. Additionally, the training mechanism 118 may receive training data such as knowledge from public repositories (e.g., Internet), knowledge from other enterprise sources, or knowledge from other pre-trained mechanisms.

Figure 2A:
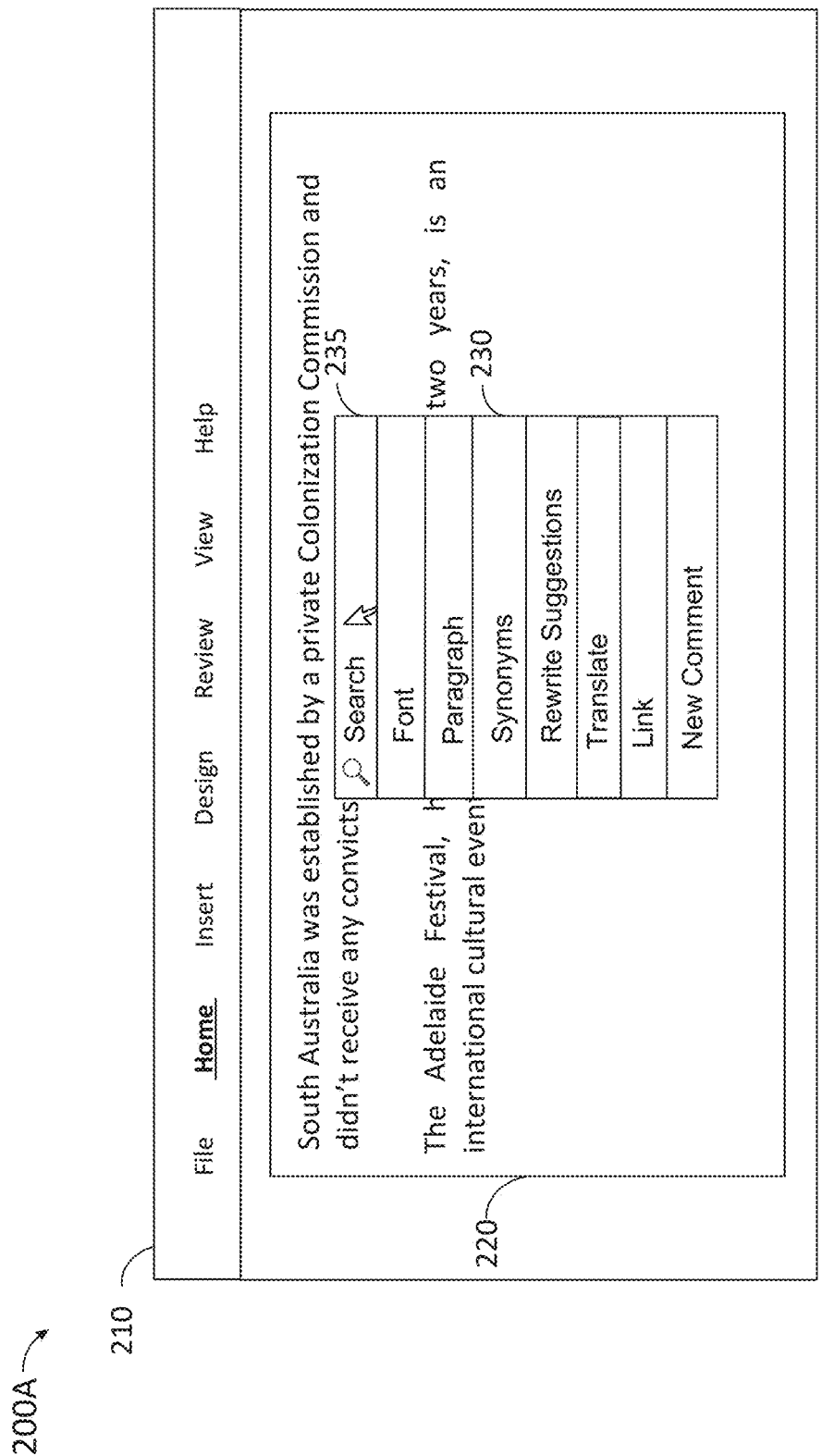
FIG. 2A-2E are example graphical user interface (GUI) screens for displaying adaptable UI elements that are provided to enable the user to achieve a desired intent.

FIG. 2A-2E are example GUI screens for displaying adaptable UI elements that are provided to enable the user to achieve a desired intent. FIG. 2A is an example GUI screen 200A of a word processing application (e.g., Microsoft Word®) displaying an example document. GUI screen 200A may include a toolbar menu 210 containing various tabs each of which may display top-level features and provide access to lower-level features for performing various tasks. For example, the toolbar menu 210 may provide options for the user to perform one or more tasks to create or edit the document. Screen 200A may also contain a content pane 220 for displaying the content of the document. The content may be displayed to the user for viewing and/or editing purposes and may be created by the user. For example, the user may utilize an input device (e.g., a keyboard) to insert input such as text into the content pane 220.

As the user creates or edits the content of the content pane 220, they may utilize an input/output device such as mouse to display a context menu 230. This may be done, for example, by right-clicking on the content pane 220. It should be noted that this is only an example method of initiating the display of the content menu 230. Many other methods for initiating the display of the context menu 230 are possible. Along with a variety of different options for editing the document, the context menu 230 may provide a menu option 235 for conducting a search. This may provide an option for the user to search for and receive results for a variety of tasks and/or different queries directly from the canvas. In this manner, the user is able to directly look for and gain access to features that can accomplish a desired intent from the content pane. This may save time, as the user does not need to look at different menu options to locate a desired feature. Furthermore, performing the search directly from the canvas can help keep the user's attention focused on the document and as such can prevent distraction and disruption of thought and workflow.

Figure 2B:
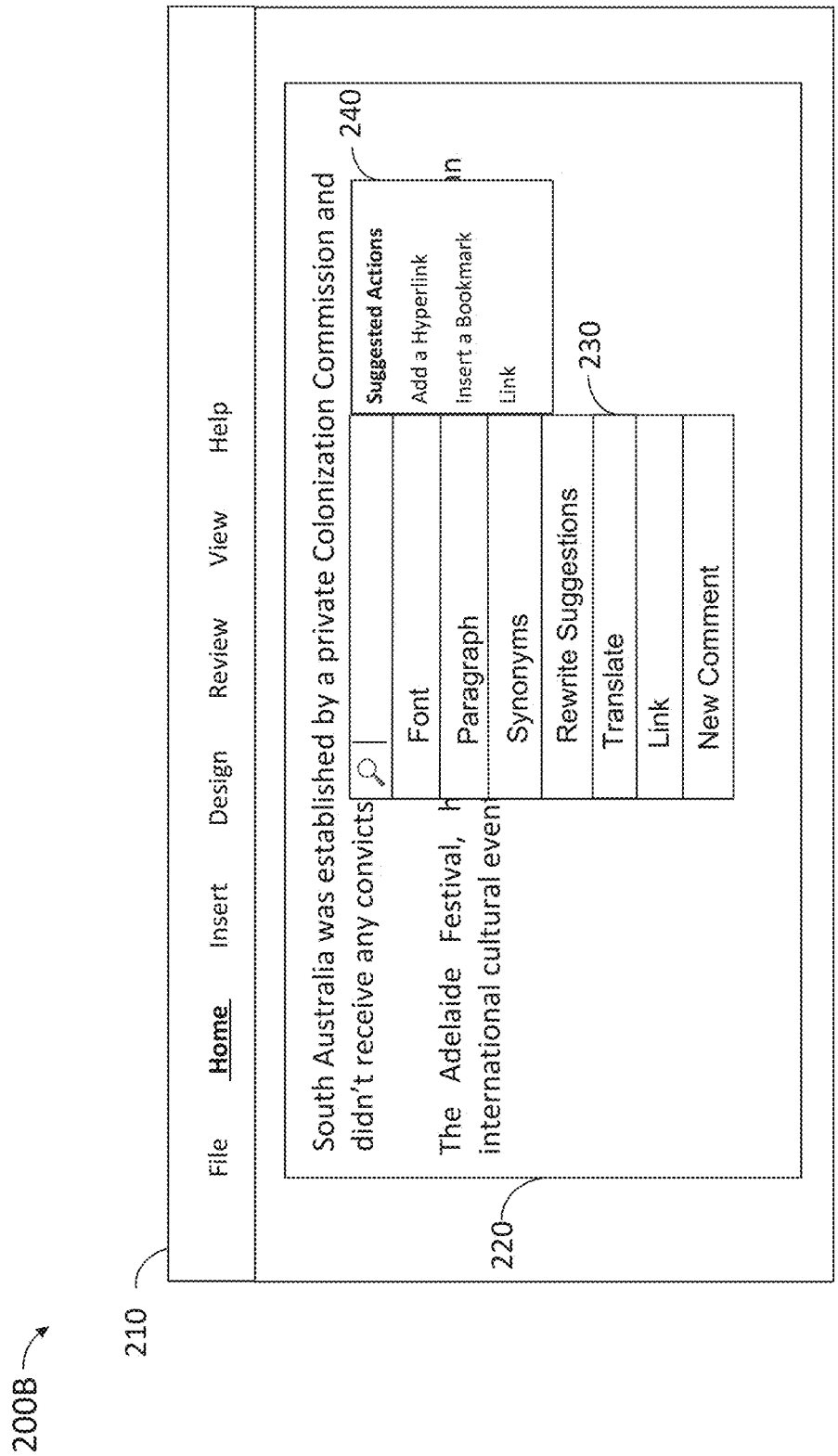
Figure 2C:
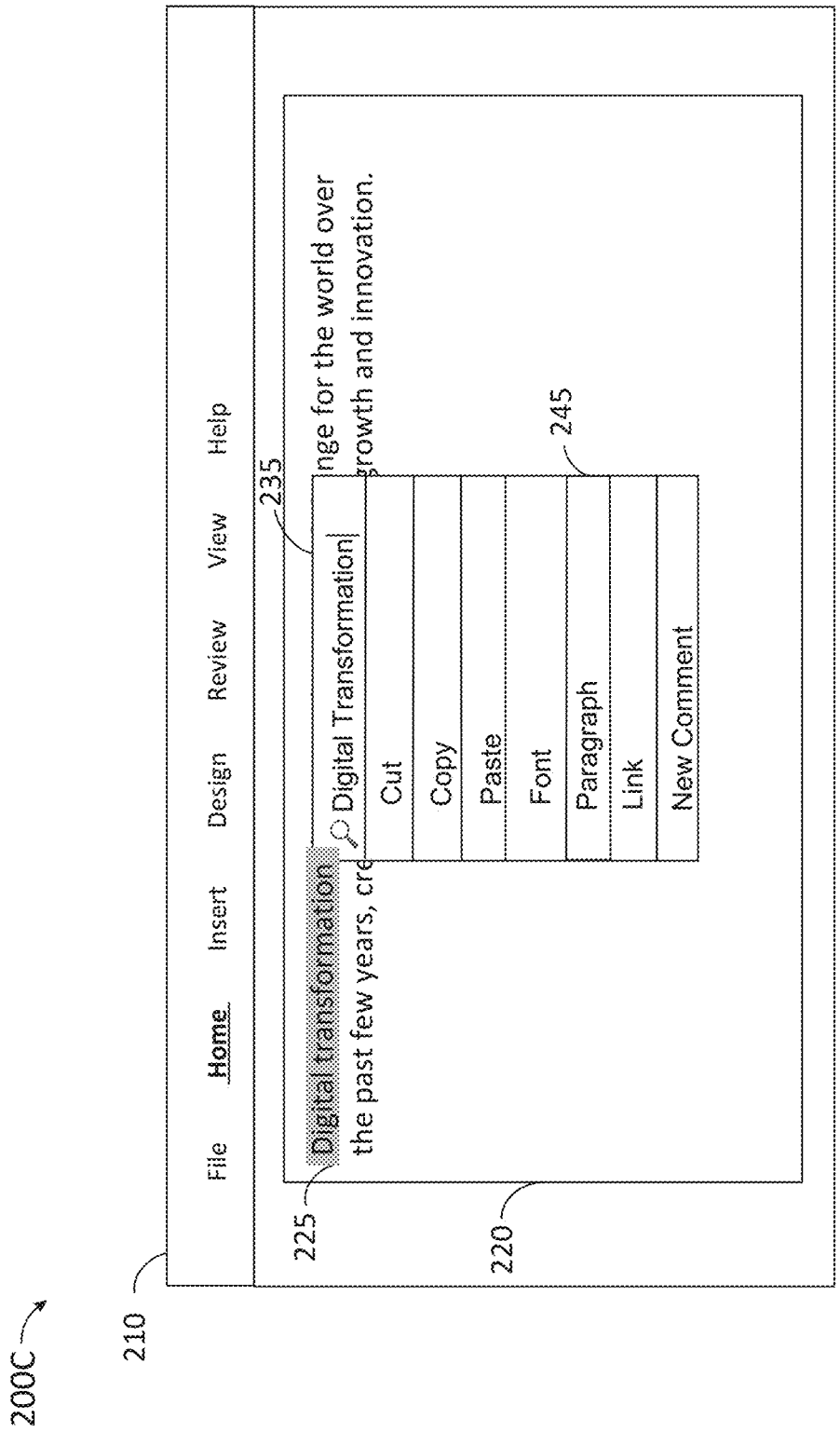
Figure 2D:
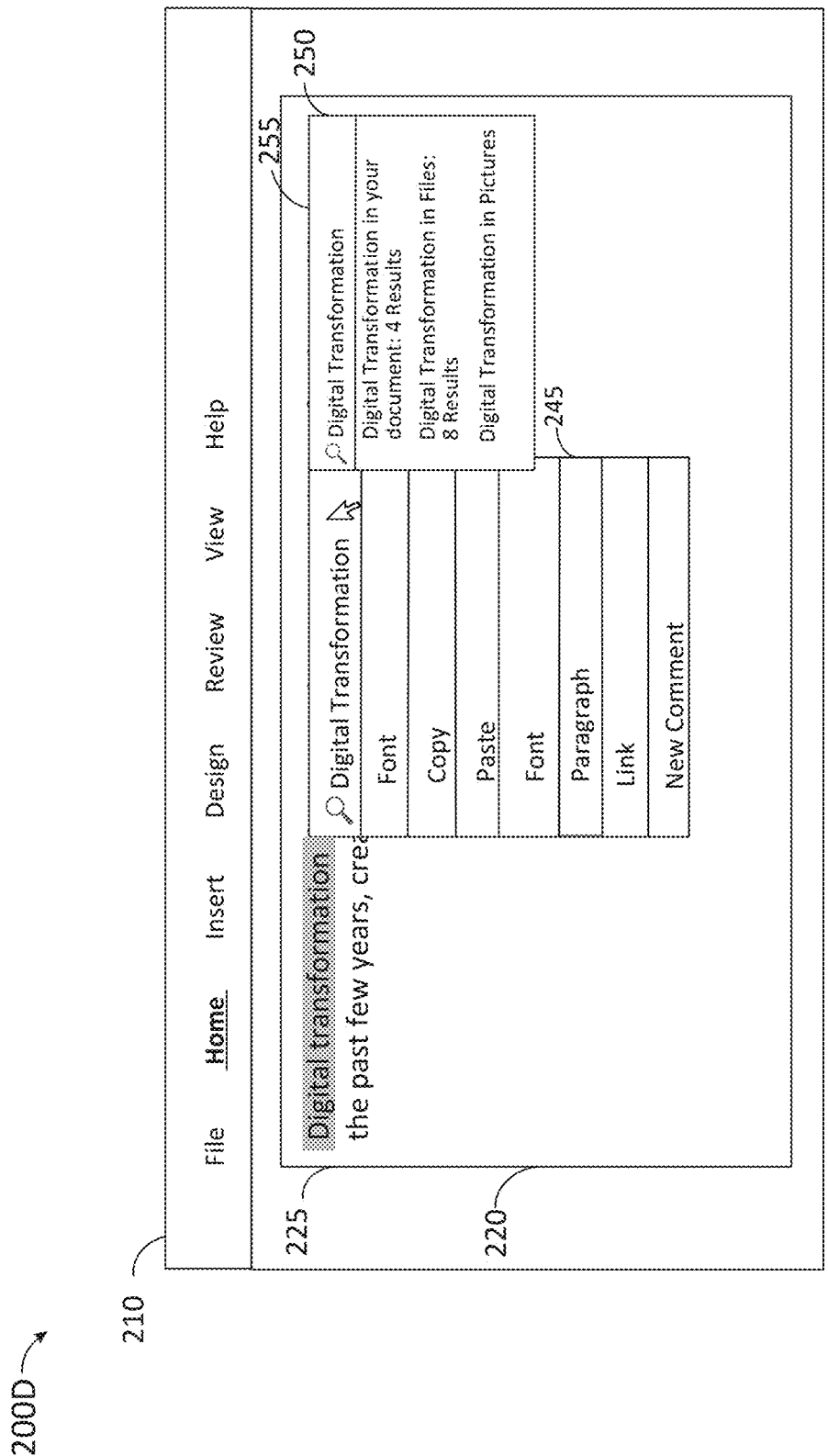
Figure 2E:
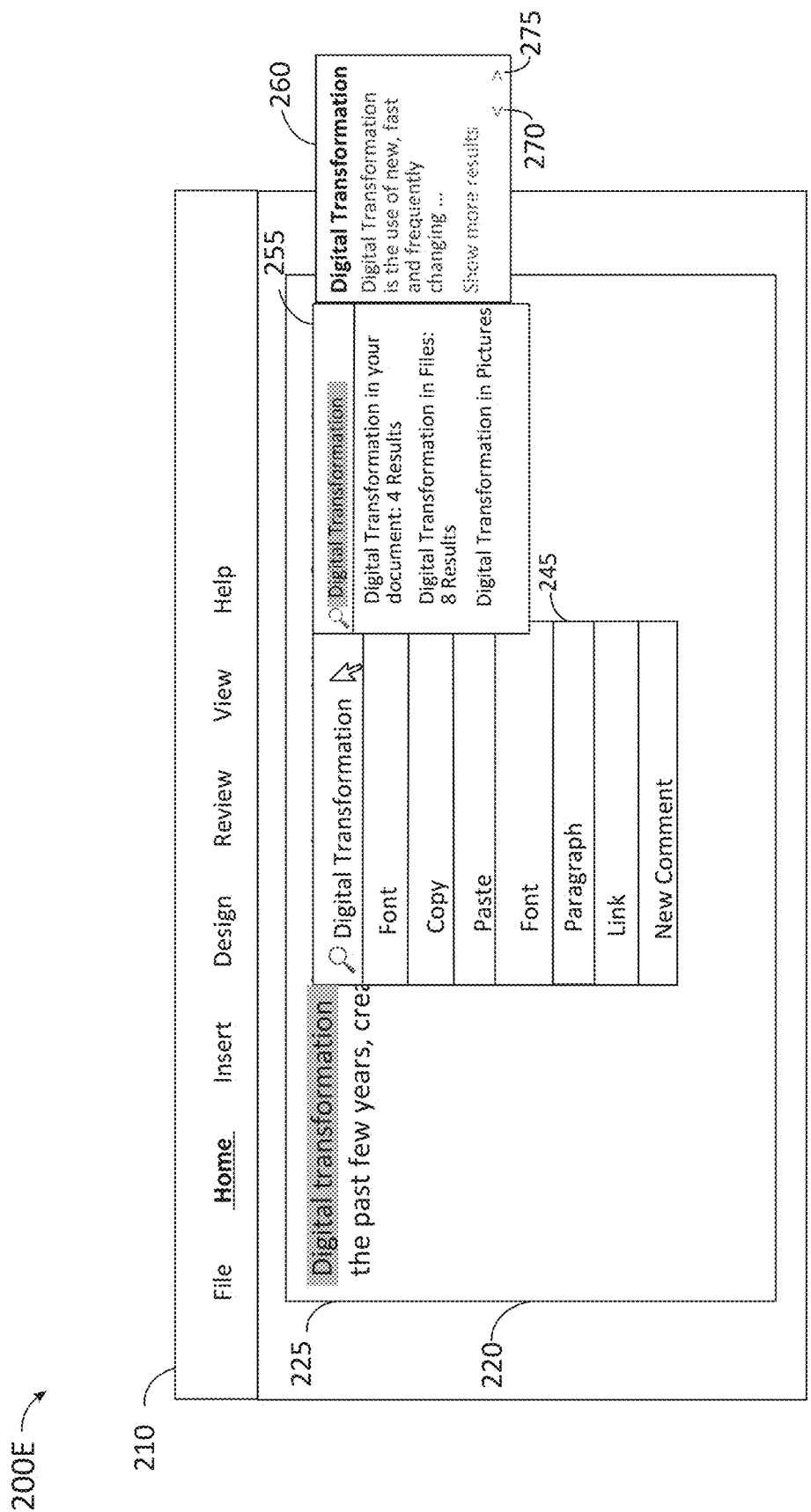

In some implementations, once the menu option 235 is selected (e.g., the user clicks in the box), a search results UI element 240, such as the one displayed in GUI screen 200B of FIG. 2B, may be displayed alongside the menu option 235 to provide suggested actions. This may be achieved via zero-term searching and may involve utilizing the intent prediction model 150 to predict the user's desired intent and using the information to identify features that can achieve the desired intent via the suggested actions. The suggested actions may be ranked by the search engine and may displayed based on their identified ranking, based on their association with the user's predicted intent. Selecting one of the suggested actions (e.g., clicking on one of the suggested actions) may cause the display of one or more other UI elements that lead the user through one or more steps required to complete the action.

In another example, a context menu may be invoked after a portion of the content has been selected. An example of this is provided in screen 200C of FIG. 2C. When a content portion such as the text portion 225 is selected before invoking the context menu, the options provided by the context menu may be different than the context menu displayed when content portion is not selected. This is because, when a content portion is selected, the user likely intends to perform a certain action or achieve a result outcome with respect to the selected content. Thus, the context menu 245 may display some options that are different than the options of the context menu 230. Furthermore, the menu option 235 of the context menu 245 may already be prepopulated with the selected text portion 225 to increase efficiency and enable the user to quick conduct a search for the selected text, if desired. In this manner, the context menu 245 may offer a quick and direct mechanism for conducting a search for a selected content portion directly from the canvas.

When the user chooses to proceed with the search by for example, clicking on the menu option 235 and pressing enter on a keyboard, search request for the selected text portion 225 may be submitted for initiating a first level search. In some implementations, this search request is transmitted to a search service such as the search service 116 to perform a search. Alternatively, the search may be conducted by a different service and/or by the application used to create the content. The first level may involve performing an internal search (internal or user associated sources) for the selected text portion. Once the search is conducted, a list of one or more search results may be displayed in a UI element such as the UI element 250 presented in screen 200D of FIG. 2D.

The search results in the UI element 250 may be categorized based on the source from which they originate. For example, as illustrated, a search may be conducted within the document content for the selected text and the results may be displayed in the UI element 250. The result may not only identify the source but may also include the number of results located in each source. Additional sources may include files (e.g., files associated with the user, client device, enterprise, document, as specific storage medium and the like), pictures (e.g. pictures stored in a specific storage medium, and or associated with the user, document, enterprise and the like). Selecting each of the search results by for example clicking on them may result in the display of one or more UI elements that present the search results to the user. Selecting the first search result may take the user to the location within the document where the selected text is located.

The user may choose to conduct an external search for the selected text portion by clicking on the menu option 255 of the UI element 250 and performing an action to invoke the menu (e.g., pressing enter). This may result in a search request being transmitted to a search service such as the search service 116 to perform an external search (e.g., searching a public or enterprise specific source) for the selected text. Once the search is conducted, a list of one or more search results may be displayed in a UI element such as the UI element 260 presented in screen 200E of FIG. 2E. The UI element 260 may display the top-ranking search result found for the selected text portion. In some implementations, the UI element 260 may display an abbreviated version of the top search result. For example, the UI element 260 may only display the first few words. However, by selecting the displayed result (e.g., clicking on the result), the user may be taken either directly to the source (e.g., a Wikipedia page) or a UI element that displays the full result. In some implementations, additional top-ranking results may be accessible by clicking on a show more results link. Furthermore, the user may be able to navigate between the different search results by utilize the forward and backward icons 270 and 275. Thus, search results may be displayed on and easily navigated directly from the content pane.

Figure 3A:
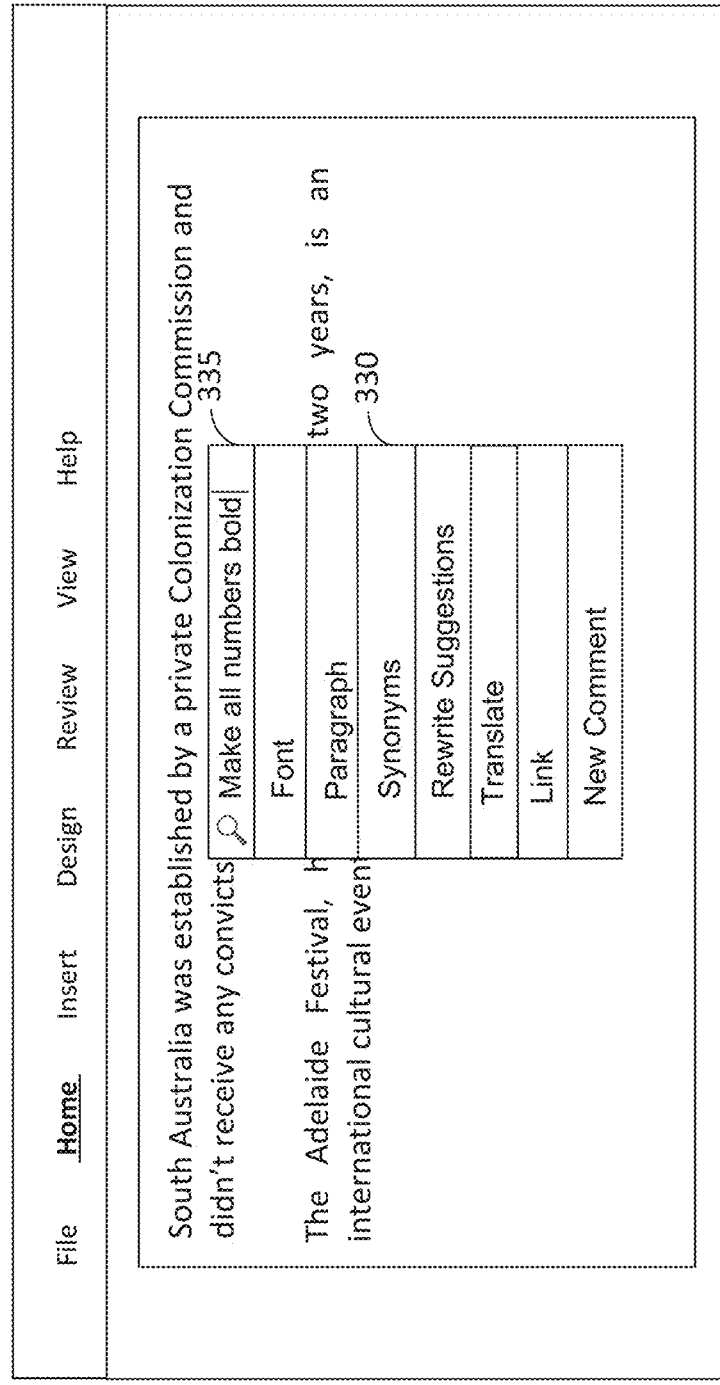
FIGS. 3A-3C are example GUI screens for submitting a search request via an on-canvas search menu option.
Figure 3B:
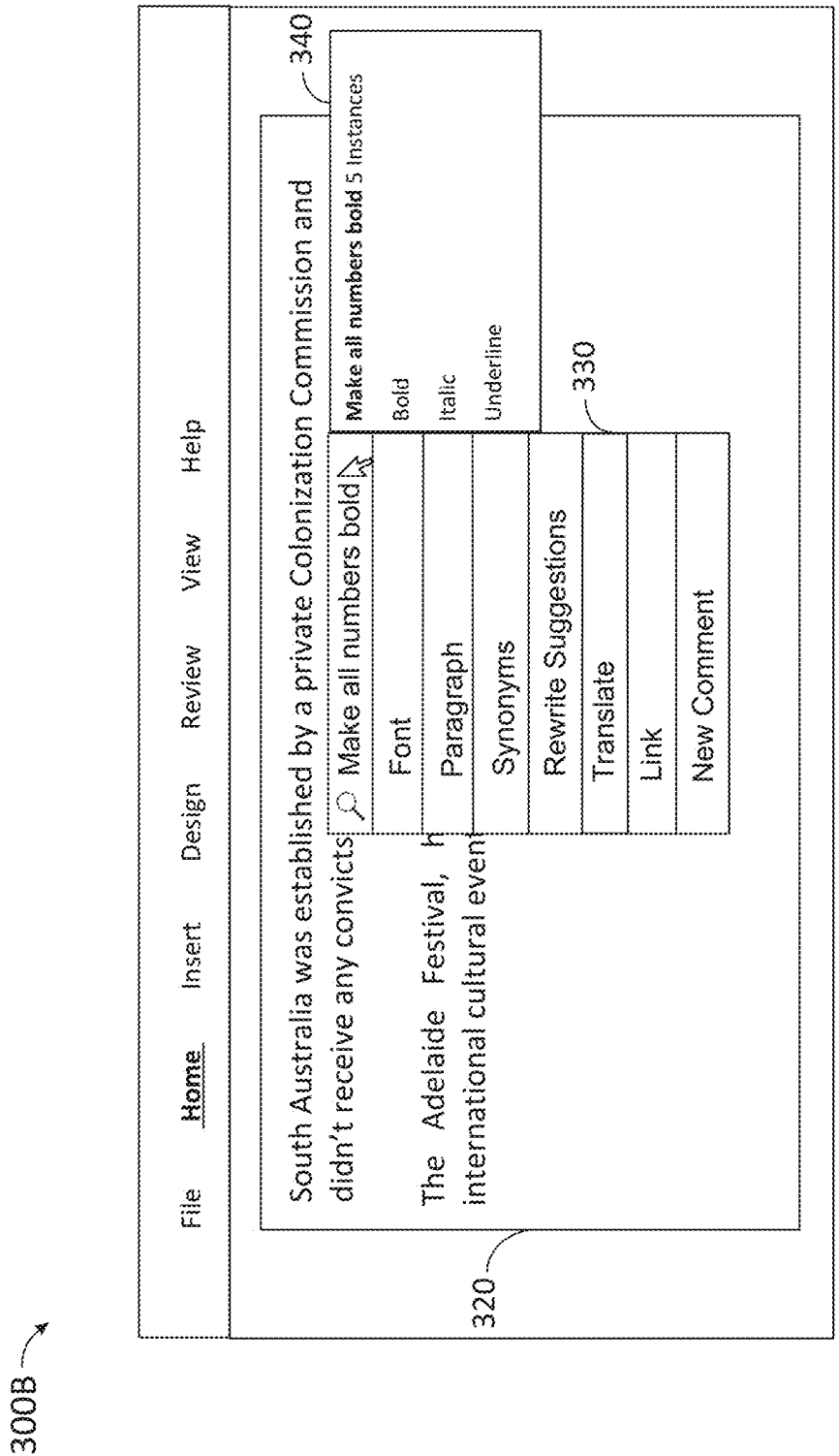

In some implementations, the user chooses to enter input into the search menu option to actively conduct a search on how to achieve a desired result. This may be done by entering one or more search terms (e.g., by typing or providing voice input) and/or entering a natural language search query in the search menu option. FIGS. 3A-3B are example GUI screens for submitting a search request via an on-canvas search menu option. FIG. 3A is an example GUI screen 300A of a word processing application (e.g., Microsoft Word®) displaying an example document. GUI screen 300A may include a content pane 320 for displaying the content of the document.

Specific user action within the content pane 320 (e.g., right clicking) may invoke the display of a UI element such as the context menu 330. In some implementations, the context menu 330 may include a search menu option 335 which may be automatically for conducting a search. The search menu option 335 may be utilized to search for application features, specific phrases (e.g., search terms), and/or submit a request. For example, the user may utilize the search menu option 335 to request that all numbers in the document be formatted to bold. The user may submit the request in the format of a natural language phrase such as "make all numbers bold" by performing a specific action such as pressing enter. The request may be submitted as a user action requiring intent prediction to the task completion service 114 of FIG. 1B to determine what the user's desired intent is (e.g., to make all numbers in the document bold), and identify the features that may correspond to this desired intent. Alternatively, the search request may be submitted to the search service 116 which may categorize the search request as a natural language request, identify keywords for the request and/or determine that the appropriate source to search is the index/list of application features. Whether via the task completion service 114 and/or the search service 116, the search results may identify that the feature likely to correspond with the query is bold. Furthermore, the feature identification model 154 may determine that to achieve the user's desired intent, all numbers in the document should be identified (e.g., highlighted) and/or UI element should be provided that enables the user to move through the numbers to bold each number. Alternatively and/or additionally, a UI element may be displayed that enables the user to accept a formatting change such as "make all numbers bold."

FIG. 3B depicts an example GUI screen 300B displaying a UI element 340 for presenting the search results to the user. As illustrates, the search results may be provided on-canvas adjacent to the context menu 330. This may provide the user the ability to achieve their desired intent directly from the content pane 320. Furthermore, the UI element 340 may display the number of instances of items (numbers) that correspond with the user's desired intent (e.g. making all numbers in the document bold). For example, the UI element 340 informs the user that that there are 5 instances that correspond with the user's desired intent. In some implementations, the UI element 340 also provides the application feature corresponding with the user's desired intent (e.g., bold) along with one or more additional application features that may be closely related to the identified application feature (e.g., italic and underline).

Figure 3C:
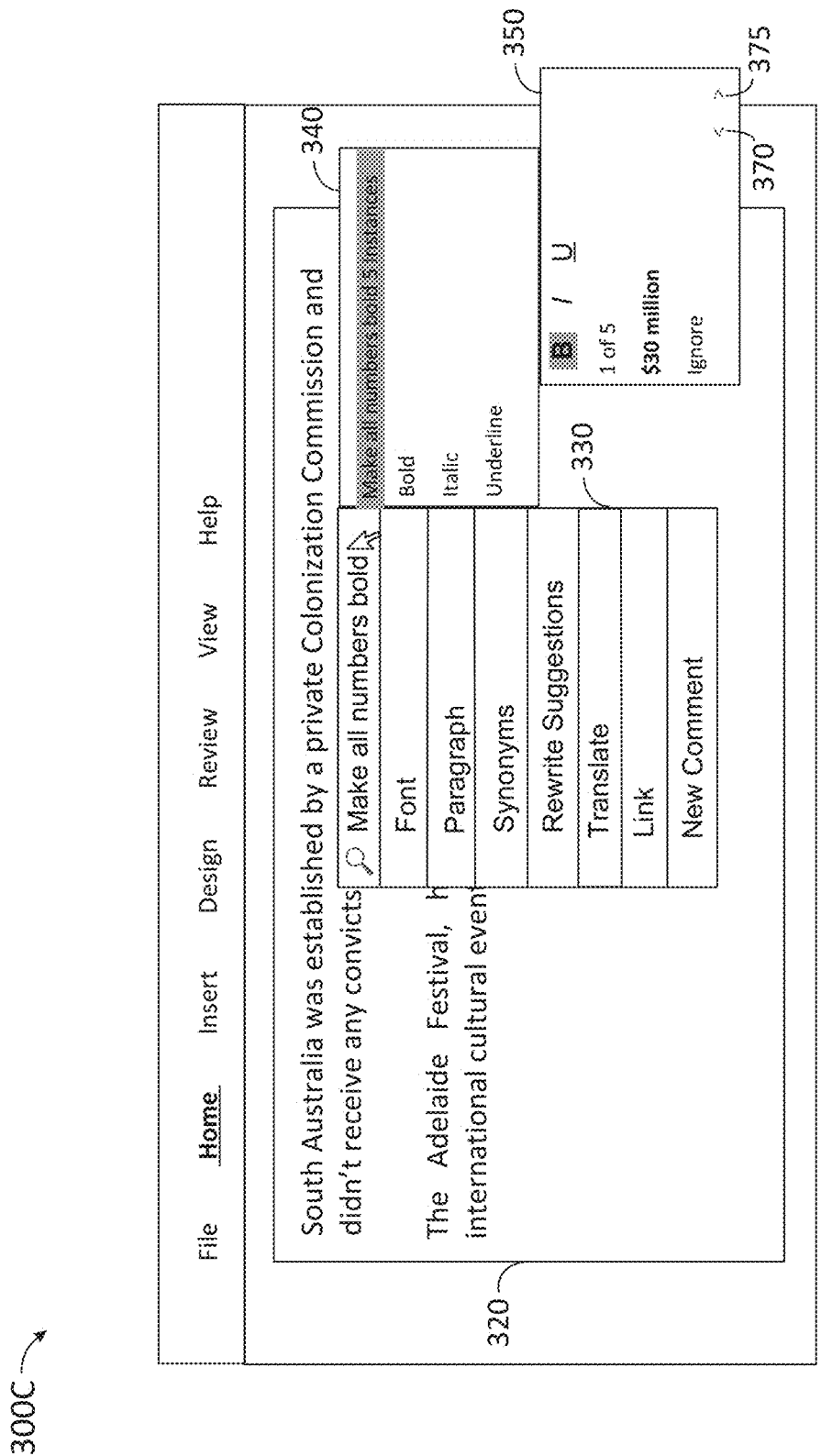

In some implementations, selecting the feature "Make all numbers bold" in the UI element 340 (e.g., by clicking on the feature) may result in the display of a UI element that walks the user through the process of making the numbers in the document bold. FIG. 3C depicts an example GUI screen 300C for providing an UI element 350 that moves the user through the process of achieving their desired intent. The UI element 350 may automatically display the first of the identified numbers in the document (e.g., $30 million) and provide the user an easy option to bold the number, as desired, by displaying the bold feature. In this manner, the user can easily achieve their desired intent directly from the canvas, and exert control over how to complete the task by proceeding through each number separately. This may be achieved by utilizing the backward and forward icons 370 and 375 that display the previous and the next number, respectively. Furthermore, the UI element 350 may display one or more other application features such as italic and underline. These may be features that are closely related to identified feature (e.g., the bold command) and may be determined as being able to achieve a broader user intent of formatting numbers.

Figure 4A:
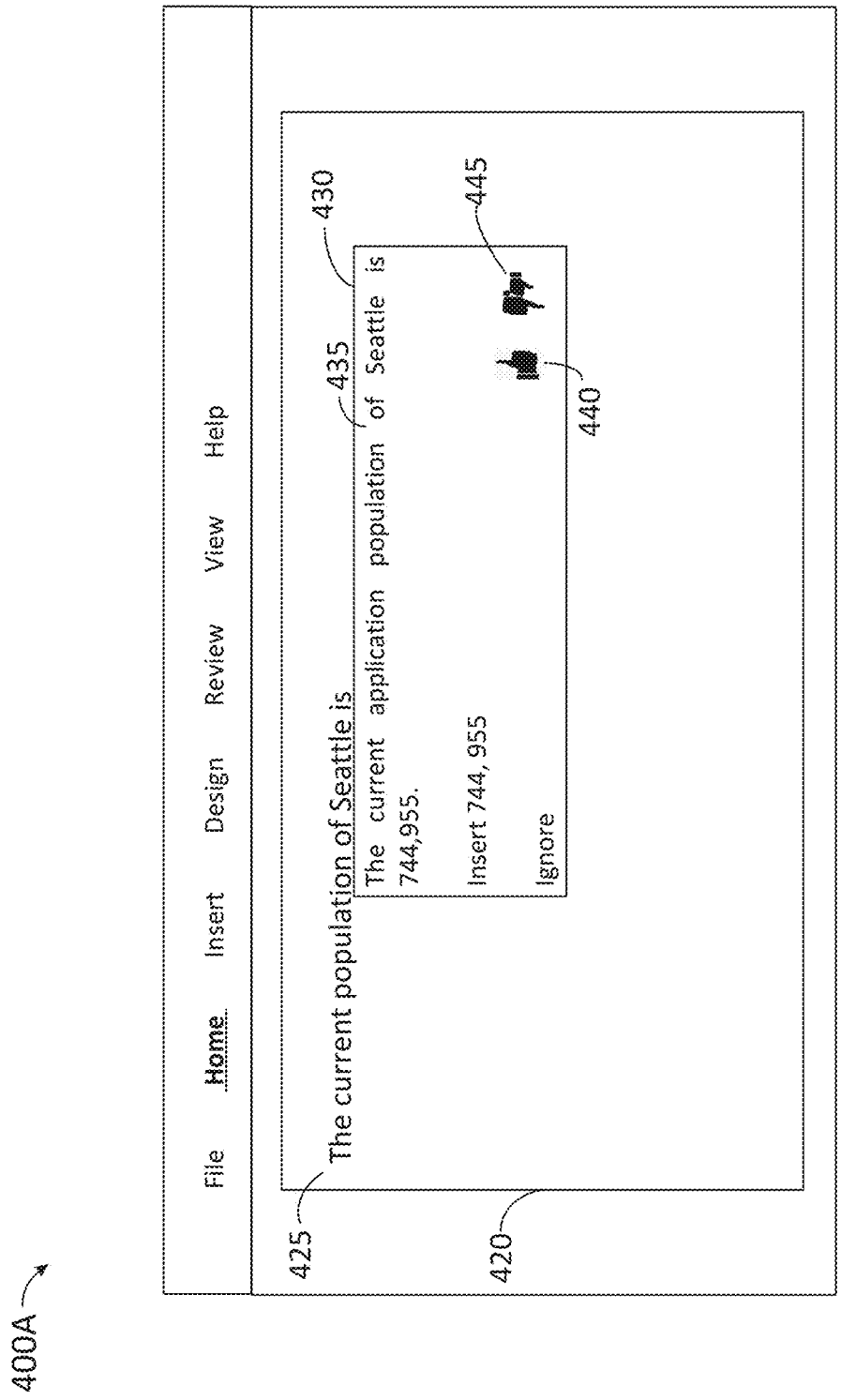
FIGS. 4A-4D are example GUI screens for automatically providing application features that enable the user to achieve a desired intent.
Figure 4B:
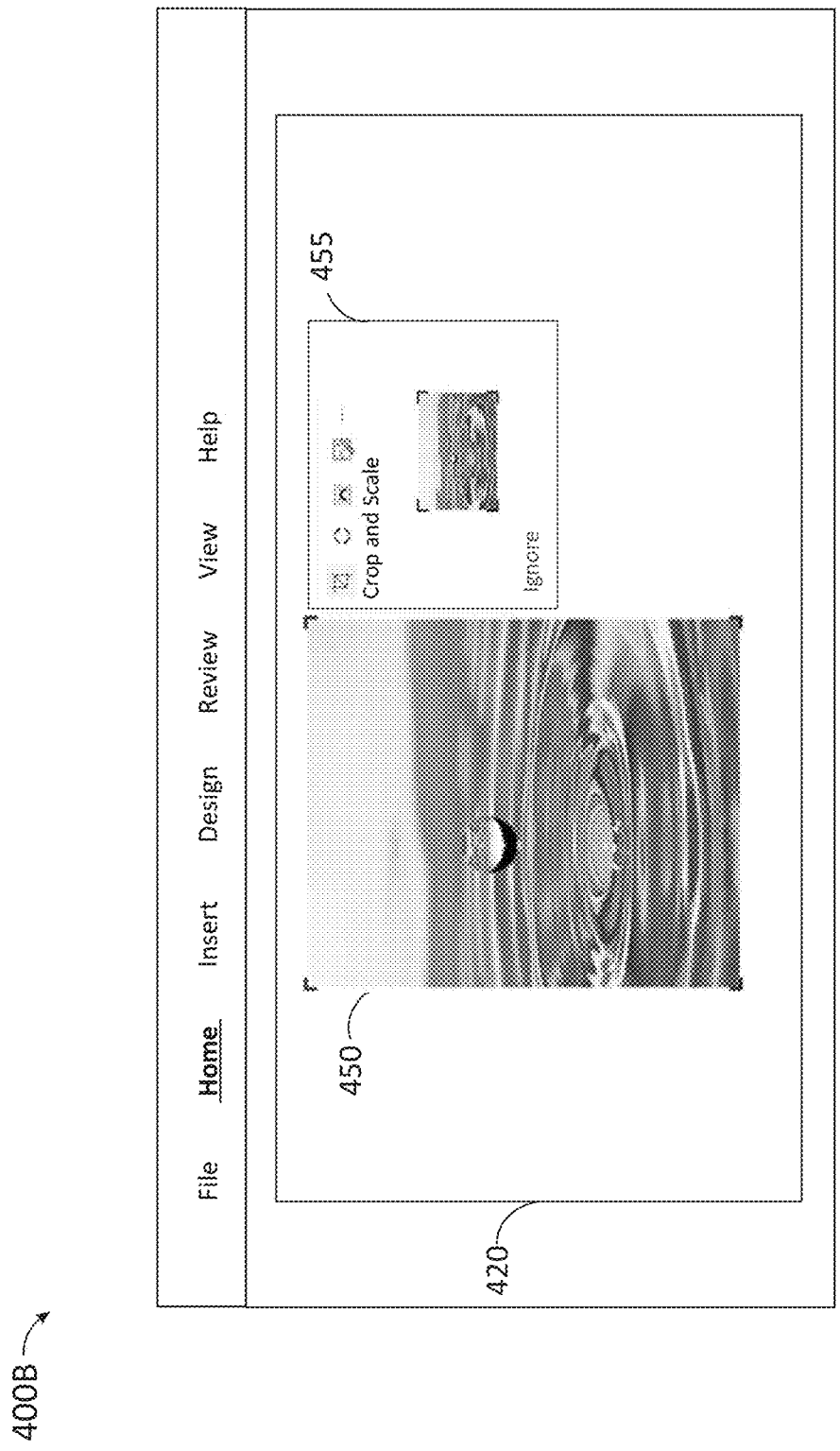
Figure 4C:
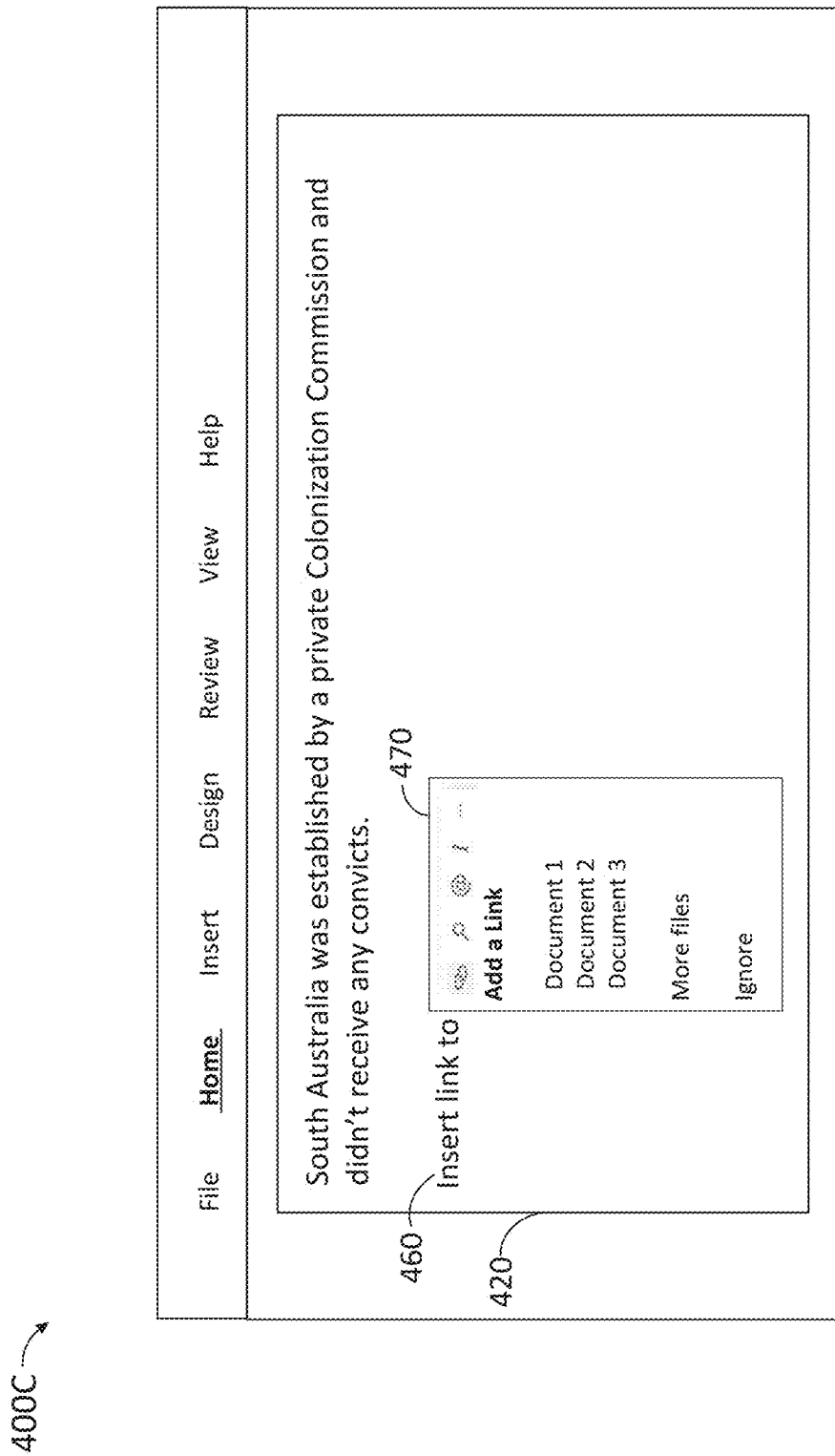

FIGS. 4A-4C are example GUI screens for automatically providing application features that enable the user to achieve a desired intent. FIG. 4A is an example GUI screen 400A of a word processing application (e.g., Microsoft Word®) displaying an example document. GUI screen 400A may contain a content pane 420 for displaying the content of the document. In some implementations, as the user is interacting with the document (e.g., entering input), the application may examine and/or transmit the interactions to a task completion service such as the task completion service 114 of FIGS. 1A-1B to automatically perform user intent prediction and/or feature identification without direct user request. This may involve determining when the user is drafting a sentence that requires a fact inquiry (e.g., researching a fact). Based on this information, it may be determined that the user's desired intent is to complete the sentence with the correct factual information. The task completion service may determine that to achieve this would require conducting a search for the factual information. As a result, a search request may be submitted to a search service such as the search service 116 of FIGS. 1A-1B to initiate searching.

In some implementations, determining that the user is drafting a sentence that requires a fact inquiry and initiating the task completion/searching process may be automatically done as a sentence requiring a fact is being draft. Additionally and/or alternatively, the process may be initiated upon additional factors that signal the user's need for researching the factual information. For example, the process may be initiated when a determination is made that the user stopped writing in the middle of an unfinished sentence. In some implementations, a timer function may be initiated to measure the amount of time passed since the last input was received in the application, and after the passage of a threshold amount, a determination may be made that the user is looking for and/or is need of help with locating factual information for the sentence, if the sentence structure and/or word usage also suggest such a scenario. When the threshold amount of time has passed, then the application may transmit a request to initiate task completion/searching for the possible factual information. In this manner, the process may be initiated proactively in instances that the user is likely to need help.

Once the search is complete, the results may be provided back to the application, which may present the result in a UI element such as the UI element 430. The UI element 430 may display one or more search results containing factual information that relate to the unfinished sentence. For example, as displayed in the UI element 430, a search result 435 may be presented in the form of a sentence that includes the missing factual information. In some implementations, selecting the search result 435 (e.g., clicking on the search result) may take the user to the source of the search result (e.g., to the webpage from which the information originates). The UI element 430 may also enable the user to directly insert the factual information into the content pane 420 (e.g., into the unfinished sentence 425) by, for example, pressing on the "Insert 744,955" UI option. Alternatively, if the use is not interested in or not satisfied with the search results, they may choose to ignore the search results, by clicking on the ignore UI option.

In some implementations, the UI element 430 includes one or more UI elements such as UI elements 440 and 445 for receiving user feedback regarding the suggested features and/or search result. In some implementations, when a user chooses to ignore or insert a search result, information regarding the search result and/or suggested feature may also be collected as user feedback to be used in finetuning the trained models.

It should be noted that the applications providing user intent prediction and/or feature suggestions may collect information from the document and/or the user as the user interacts with the document and/or the suggestions to better train the ML models used in providing user intent prediction, feature identification and/or searching. For example, the application may collect information relating to which one of the suggested features the user selects and/or which ones they ignore. To ensure that context is taken into account, when using the information, the user action resulting in the display of the suggested features, contextual document data and/or other information about the document and/or user may also be collected. For example, information about the type of document (e.g., word document, email, presentation document, etc.), the topic of the document, the position of the user within an organization (e.g., the user's job title or department to which the user belongs, if known), and other non-linguistic features such as the time of the day, the date, the device used, the person to whom the document is directed (e.g., the to line in an email), and the like may be collected and used to provide better suggestions. It should be noted that in collecting and storing this information, care must be taken to ensure privacy is persevered.

To ensure compliance with ethical and privacy guidelines and regulations, in one implementation, an optional UI element may be provided to inform the user of the types of data collected, the purposes for which the data may be used and/or to allow the user to prevent the collection and storage of user related data. The UI may be accessible as part of features provided for customizing an application via a GUI displayed by the application when the user selects an options menu button. Alternatively, the information may be presented in a user agreement presented to the user when they first install the application.

FIG. 4B depicts an example GUI screen 400B for proactively displaying suggested application features upon specific user actions. In an example, when the user inserts an object such as an image 450 of screen 400B, information about the user action may be transmitted to a task completion service such as the task completion service 114 of FIGS. 1A-1B to initiate prediction of user's desired intent. This may result in the task completion service determining based on, for example, the remaining content of the document (e.g., other images in the document) that the user's desired intent would be to format the image in a way that corresponds with the other images currently contained in the document. This may result in the automatic display of the UI element 455 which may display the identified features of crop and scale. Furthermore, the UI element 455 may provide a preview of the changes such that the user can view the potential changes and make an informed decision. The UI element 455 may also include one or more additional suggested features that the feature identification models may determine relate to an inserted object or are likely to be used by the user. These may include rotate image, layout options, and others. Thus, the application may provide suggested features that may be useful in achieving a user's desired intent proactively and without any direct request from the user. This may enable the user to utilize features that the user is not aware of and/or does not normally use but can increase efficiency and/or improve the quality/aesthetics of the content.

FIG. 4C depicts an example GUI screen 400C for proactively displaying another set of suggested application features upon specific user actions. In an example, when the user inputs content that indicates a desire to insert a link to a document, a UI element 470 may automatically be displayed in the content pane 420. The user input may include one or more words that indicate a desire to insert a link. For example, the phrase 460 stating "insert link to" may signal the desired intent to insert a link to a document. Upon the user action, the application may transmit a request to the task completion service to enable intent prediction and/or feature suggestion. The task completion service may predict the user's desired intent to insert a link to a document and may identify the feature of "Add a link" as a feature corresponding with the desired intent. Furthermore, the search service may be utilized to identify one or more documents that the user is likely to be interested in inserting a link to. This information may be transmitted to the application, which may in turn display the information in the UI element 470.

The UI element 470 may enable the user to insert a link to either one of the documents 1, 2 or 3 directly from the UI element 470. Access to additional documents may be provided by selecting the "More files" option. Furthermore, the UI element 470 may provide quick access to one or more additional features that may be related to and/or are likely to help the user achieve their desired intent. For example, the UI element 470 includes access to conducting a search, inserting an at-mention, and italicizing the content, among others. If the user is not interested in any of the features offered via the UI element 470, they may choose to remove the UI element 470 by selecting the ignore option.

Figure 4D:
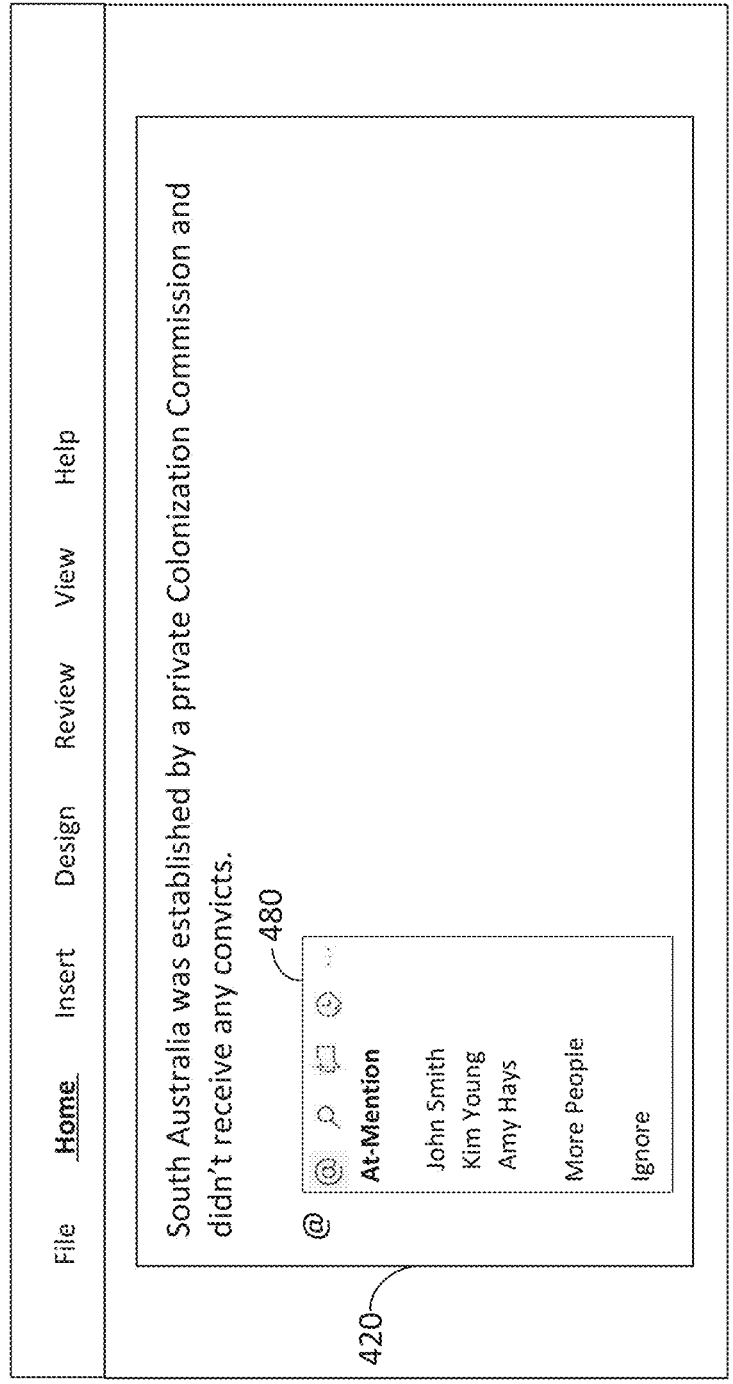

FIG. 4D depicts an example GUI screen 400D for proactively displaying a set of suggested application features upon other specific user actions. In an example, when the user inputs content that indicates a desire to mention another user in the document, a UI element 480 may automatically be displayed in the content pane 420. The user input may include one or more words, symbols, or other input that indicate a desire to mention another user within the content. For example, use of the @ symbol may indicate the desired intent to insert an in-document mention of another user. Upon this user action, the application may transmit a request to the task completion service to enable intent prediction and/or feature suggestion. The task completion service may predict the user's desired intent to insert a link to another user and may identify the feature of "At-Mention" as the feature corresponding with the desired intent. Furthermore, the search service may be utilized to identify one or more people that the user is likely to be interested in mentioning in the document. This information may be inferred from user-specific data such as information relating to people that the user often collaborates with, people in the user's team, and the like. Furthermore, the information may be gleaned from the contextual document data relating to people who have worked on the document in the past. The identified feature along with the names of the suggested people may be transmitted to the application, which may display the information in the UI element 480.

The UI element 480 may enable the user to insert a link to either one of the suggested users directly from the UI element 480 by clicking on their names. In an example, upon clicking a user's name, the name of the person, along with a link to their contact information (e.g., email address) may be inserted into the content pane 420. Access to additional people may be provided by selecting the "More people" option. Furthermore, the UI element 480 may provide quick access to one or more additional features that may be related to and/or are likely to help the user achieve their desired intent. For example, the UI element 480 includes access to conducting a search, and inserting a comment, among others. If the user is uninterested in any of the features offered via the UI element 480, they may choose to remove the UI element 480 by selecting the ignore option.

Figure 5:
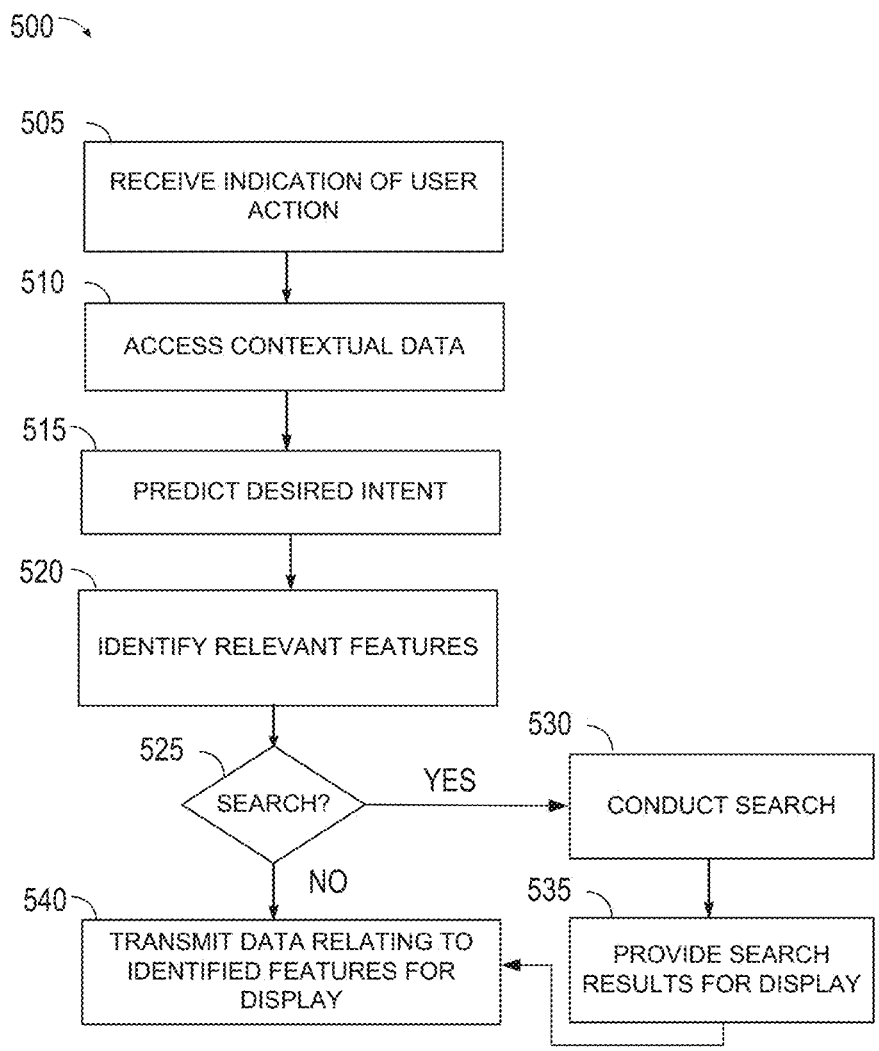
FIG. 5 is a flow diagram depicting an example method for providing intelligent user intent prediction and feature identification.

FIG. 5 is a flow diagram depicting an exemplary method 500 for providing intelligent user intent prediction and feature identification. In an example, one or more steps of method 500 may be performed by a task completion service (e.g., task completion service 114 of FIGS. 1A-1B) and/or a search service (e.g., search service 116 of FIGS. 1A-1B). Other steps of method 500 may be performed by a content creation application (e.g., applications 112 or applications 126 of FIGS. 1A-1B).

At 505, method 500 may begin by receiving an indication of user action that signals the user may have a desired intent to complete a task or achieve a purpose. As discussed above, the user action may be any interaction the user has with a document while using an application such as a content creation application. Upon receiving the indication, method 500 may proceed to access contextual data, at 510. The contextual data may include contextual document data, user-specific data, data relating to the action(s) taken by the user in the document, enterprise-specific data, and/or any other data that may provide helpful information in inferring the user's desired intent with respect to the document. In some implementations, at least some of the contextual data may be transmitted with the indication of user action. The contextual data may be stored and/or provided in a storage medium and provided to the task completion service, as requested and/or needed.

In some implementations, accessing contextual data involves utilizing one or more text analytics algorithms that may examine the content, context, formatting and/or other parameters of the document to identify a style associated with the document, keywords associated with the document (e.g. the title of the document), the type of content, the type of application, and the like. It should be noted that in collecting and analyzing document data is taken to ensure users privacy is protected.

The text analytics algorithms may include natural language processing algorithms that allow topic or keyword extractions, for example, in the areas of text classification and topic modeling. Examples of such algorithms include, but are not limited to, term frequency-inverse document frequency (TF-IDF) algorithms and latent Dirichlet allocation (LDA) algorithms Topic modeling algorithms may examine the document and/or a content segment from the document to identify and extract salient words and items that may be recognized as keywords. Keywords may assist in predicting intent and/or conducting a search, when needed.

Once the contextual data has been accessed, method 500 may proceed to predict the user's desired intent with respect to the document they are working on, at 515. This may be achieved by utilizing one or more ML models that receive the user's action(s) and the contextual data as an input and provide one or more predicted user intents as an output. For example, the process may involve using the intent prediction model 150 of FIG. 1B and may involve various steps discussed above with respect to FIG. 1B.

Once one or more desired intents are predicted, method 500 may proceed to identify relevant features that correspond to the predicted desired intent, at 520. This may involve utilizing an ML model such as the feature identification model 154 of FIG. 1B and may include receiving the predicted desired intent and determining based on a set of available application features and other parameters, which features are more likely to achieve the user's desired intent.

In some implementations, ML algorithms are used to examine activity history of the user within the document or within the user's use of the application to identify patterns in the user's usage. For example, the types of feature suggestions accepted by the user in a previous session of the document (or earlier in the current session) may be examined to identify patterns. In another example, suggested features that are ignored by the user may be collected and examined to determine if the user disregards certain features. Furthermore, user history data may be collected and examined in providing suggested features. For example, this may be done during a prioritization and sorting process of identified features. The history may be limited to the user's recent history (i.e., during a specific recent time period or during the current session) or may be for the entirety of the user's use of one or more applications. This information may be stored locally and/or in the cloud. In one implementation, the history data may be stored locally temporarily and then transmitted in batches to a data store in the cloud which may store each user's data separately for an extended period of time or as long as the user continues using the application(s) or as long as the user has granted permission for such storage and use.

In one implementation, feature suggestion history and data extracted from other users determined to be in a same category as the current user (e.g., in the same department, having the same job title, or being part of the same organization) may also being examined in determining desired intent and/or identifying features. Furthermore, method 500 may consult a global database of desired intent and/or suggested feature history and document content to identify global patterns. In one implementation, in consulting the global database, the method identifies and uses data for users that are in a similar category as the current user. For example, the method may use history data from users with similar activities, similar work functions and/or similar work products. The database consulted may be global but also local to the current device.

Once, the relevant features are identified and/or as part of the feature identification process, method 500 may proceed to determine if a search is needed, at 525. For example, method 500 may determine if the user's desired intent is searching for one or more commands, searching for factual information, or searching for one or more keywords. When it is determined, at 525, that a search is needed (yes, at step 525), method 500 may proceed to conduct the search, at 530. This may be achieved by utilizing a search service such as the search service 116 of FIGS. 1A-1B.

After the search is completed, the search results may be provided to the application and/or the task completion service for transmission to the application, at 535. Once the search results are provided, or when it is determined, at step 525, that no searching is required, method 500 may proceed to transmit data relating to the identified features to the application for display to the user, at 540. Upon receiving the data, the application may determine one or more mechanisms for displaying the data in a manner that is easy to decipher and navigate, reduces unnecessary disruptions and/or conserves UI space. In some implementations, this involves displaying the search results and/or identified features on-canvas.

Figure 6:
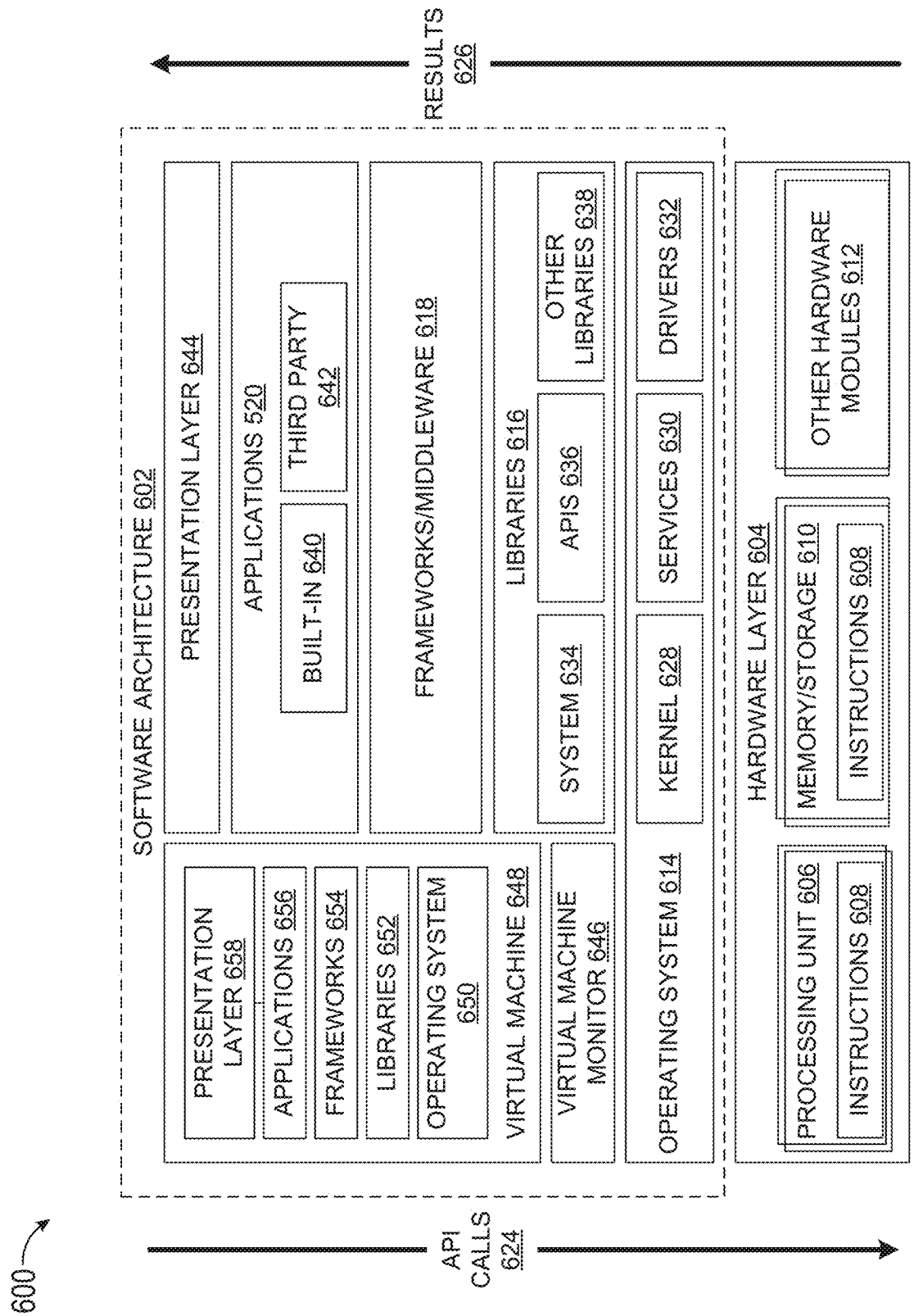
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 624. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 620 and/or third-party applications 622. Examples of built-in applications 620 may include, but are not limited to, a contacts application, a browser application, a location application, a media application, a messaging application, and/or a game application. Third-party applications 622 may include any applications developed by an entity other than the vendor of the particular system. The applications 620 may use functions available via OS 614, libraries 616, frameworks 618, and presentation layer 624 to create user interfaces to interact with users.

Some software architectures use virtual machines, as illustrated by a virtual machine 628. The virtual machine 628 provides an execution environment where applications/modules can execute as if they were executing on a hardware machine (such as the machine depicted in block diagram 600 of FIG. 6, for example). The virtual machine 628 may be hosted by a host OS (for example, OS 614) or hypervisor, and may have a virtual machine monitor 626 which manages operation of the virtual machine 628 and interoperation with the host operating system. A software architecture, which may be different from software architecture 602 outside of the virtual machine, executes within the virtual machine 628 such as an OS 650, libraries 652, frameworks 654, applications 656, and/or a presentation layer 658.

Figure 7:
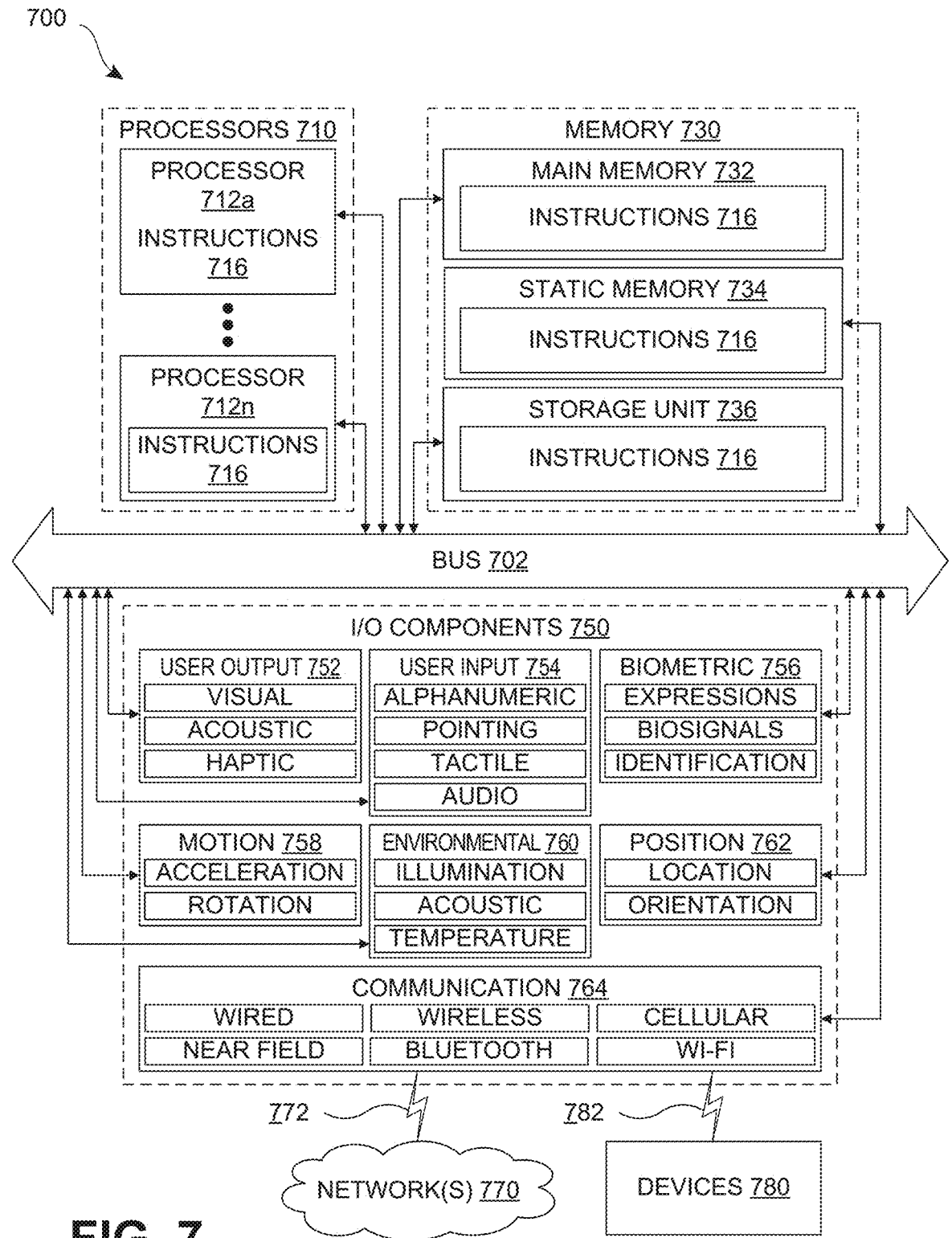
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. data processing system comprising:
a processor; and
a memory in communication with the processor, the memory comprising executable instructions that, when executed by, the processor, cause the data processing system to perform functions of:
receiving an indication of a user action in relation to a document;
accessing contextual document data associated with the document;
providing at least one of information about the user action or the contextual document data as input to a machine-learning (ML) model to predict a desired intent for the document;
obtaining the predicted desired intent as an output from the ML model;
identifying, based on the predicted desired intent, one or more application features that fulfill the predicted desired intent; and
providing data about the one or more application features for display Item 2. The data processing system of item 1, wherein the instructions further cause the processor to cause the data processing system to perform functions of:
accessing user-specific data associated with a user of the document; and
providing the user-specific data to the ML model.

Item 3. The data processing system of any one of items 1 or 2, wherein identifying the one or more application features comprises:
providing the predicted desired intent and at least one of the contextual document data and user-specific data to another ML model for identifying the one or more application features that fulfill the predicted desired intent; and
obtaining the identified one or more application features from the another ML model.

Item 4. The data processing system of any one of the preceding items, wherein the indication of user action includes a user request for display of application features.

Item 5. The data processing system of any one of the preceding items, wherein the indication of user action does not include a user request for display of application features.

Item 6. The data processing system of any one of the preceding items, wherein the instructions further cause the processor to cause the data processing system to perform functions of:
determining if the predicted desired intent includes conducting a search;
providing the predicted desired intent to a search service for conducting the search;
obtaining search results from the search service; and
providing the search results for display.

Item 7. The data processing system of any one of the preceding items, wherein the user action includes selection of a portion of content in the document.

Item 8. A method for providing one or more suggested application features, comprising:
receiving an indication of a user action in relation to a document;
accessing contextual document data associated with the document;
providing at least one of information about the user action or the contextual document data as input to a machine-learning (ML) model to predict a desired intent for the document;
obtaining the predicted desired intent as an output from the ML model;
identifying based on the predicted desired intent one or more application features that fulfil the predicted desired intent; and
providing data about the one or more application features for display.

Item 9. The method of item 8, further comprising:
accessing user-specific data associated with a user of the document; and
providing the user-specific data to the ML model.

Item 10. The method of any one of items 8 or 9, further comprising:
providing the predicted desired intent and at least one of the contextual document data and user-specific data to another ML model for identifying the one or more application features that fulfill the predicted desired intent; and
obtaining the identified one or more application features from the another ML model.

Item 11. The method of any one of items 8-10, wherein the indication of user action includes a user request for display of application features.

Item 12. The method of any one of items 8-11, wherein the indication of user action does not include a user request for display of application features.

Item 13. The method of any one of items 8-12, further comprising:
determining if the predicted desired intent includes conducting a search;
providing the predicted desired intent to a search service for conducting the search;
obtaining search results from the search service; and
providing the search results for display.

Item 14. The method of any one of items 8-13, wherein the user action includes selection of a portion of content in the document.

Item 15. A non-transitory computer readable medium on which are stored instructions that, when executed, cause a programmable device to:

receive an indication of a user action in relation to a document;
access contextual document data associated with the document;
provide at least one of information about the user action or the contextual document data as input to a machine-learning (ML) model to predict a desired intent for the document;
obtain the predicted desired intent as an output from the ML model;
identifying based on the predicted desired intent one or more application features that fulfill the predicted desired intent; and
provide data about the one or more application features for display.

Item 16. The non-transitory computer readable medium of item 15, wherein the instructions further cause the programmable device to:
access user-specific data associated with a user of the document; and
provide the user-specific data to the ML model.

Item 17. The non-transitory computer readable medium of any one of items 15 or 16, wherein the instructions further cause the programmable device to:
provide the predicted desired intent and at least one of the contextual document data and user-specific data to another ML model for identifying the one or more application features that fulfill the predicted desired intent; and
obtain the identified one or more application features from the another ML model.

Item 18. The non-transitory computer readable medium of any one of items 15-17, wherein the indication of user action includes a user request for display of application features.

Item 19. The non-transitory computer readable medium of any one of items 15-18, wherein the indication of user action does not include a user request for display of application features.

Item 20. The non-transitory computer readable medium of any one of items 15-19, wherein the instructions further cause the programmable device to:
determine if the predicted desired intent includes conducting a search;
provide the predicted desired intent to a search service for conducting the search;
obtain search results from the search service; and
provide the search results for display.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
receiving a user request from within a content pane displaying a document;
in response to the user request, generating a user interface element on the content pane, the document being a currently open document in an application, and the user interface element being a selectable input box for receiving one or more search terms;
displaying the user interface element on the content pane;
receiving user selection of the input box from a user to select the user interface element;

in response to receiving the user selection, accessing contextual document data associated with the document;

providing content of the document, user-specific information for the user, one or more recent actions of the user and the contextual document data as input to a machine-learning (ML) model to predict a desired intent for completing a task with respect to the document;

obtain the predicted desired intent as an output from the ML model;

identify a command provided by the application for achieving the predicted desired intent;

displaying a selectable user interface menu on the content pane for selecting the identified command receiving an indication of selection of the identified command; and responsive to receiving the indication of the selection, completing a task associated with the predicted desired intent.

2. The data processing system of claim 1, wherein the user input from the user to select the user interface element initiates a zero-term search.

3. A method for completing a task in an application, comprising:

receiving a user request from within a content pane displaying a document;

in response to the user request, generating a user interface element on the content pane, the document being a currently open document in the application, and the user interface element being a selectable input box for receiving one or more search terms;

displaying the user interface element on the content pane;

receiving user selection of the input box from a user to select the user interface element;

in response to receiving the user selection, accessing contextual document data associated with the document;

providing content of the document, user-specific information for the user, one or more recent actions of the user and the contextual document data as input to a machine-learning (ML) model to predict a desired intent for completing a task with respect to the document;

obtain the predicted desired intent as an output from the ML model;

identify a command provided by the application for achieving the predicted desired intent;

displaying a selectable user interface menu on the content pane for selecting the identified command receiving an indication of selection of the identified command; and responsive to receiving the indication of the selection, completing a task associated with the predicted desired intent.

4. The method of claim 3, wherein the user input from the user to select the user interface element initiates a zero-term search.

5. A non-transitory computer readable medium on which are stored instructions that, when executed, cause a programmable device to:

receiving a user request from within a content pane displaying a document;

in response to the user request, generating a user interface element on the content pane, the document being a currently open document in an application, and the user interface element being a selectable input box for receiving one or more search terms;

displaying the user interface element on the content pane;

receiving user selection of the input box from a user to select the user interface element;

in response to receiving the user selection, accessing contextual document data associated with the document;

providing content of the document, user-specific information for the user, one or more recent actions of the user and the contextual document data as input to a machine-learning (ML) model to predict a desired intent for completing a task with respect to the document;

obtain the predicted desired intent as an output from the ML model;

identify a command provided by the application for achieving the predicted desired intent;

displaying a selectable user interface menu on the content pane for selecting the identified command receiving an indication of selection of the identified command; and responsive to receiving the indication of the selection, completing a task associated with the predicted desired intent.

6. The non-transitory computer readable medium of claim 5, wherein the user input from the user to select the user interface element initiates a zero-term search.

* * * * *